(12) United States Patent
Kimmich et al.

(10) Patent No.: US 7,944,872 B2
(45) Date of Patent: May 17, 2011

(54) ADAPTIVE CODING AND MODULATION AWARE NETWORK LOAD BALANCING

(75) Inventors: Kevin Kimmich, Chardon, OH (US); Fan Mo, Stow, OH (US); Mark Vanderaar, Medina, OH (US)

(73) Assignee: ViaSat, Inc., Carlsbad, CA (US)

( * ) Notice: Subject to any disclaimer, the term of this patent is extended or adjusted under 35 U.S.C. 154(b) by 165 days.

(21) Appl. No.: 12/250,392

(22) Filed: Oct. 13, 2008

(65) Prior Publication Data

US 2009/0073876 A1 Mar. 19, 2009

Related U.S. Application Data

(63) Continuation-in-part of application No. 11/956,200, filed on Dec. 13, 2007.

(60) Provisional application No. 60/869,809, filed on Dec. 13, 2006.

(51) Int. Cl.
*H04B 7/185* (2006.01)
(52) U.S. Cl. ......... 370/316; 370/310; 370/347; 370/468
(58) Field of Classification Search .................. 370/229, 370/330, 468, 316, 310, 347
See application file for complete search history.

(56) References Cited

U.S. PATENT DOCUMENTS

| | | | |
|---|---|---|---|
| 6,215,776 B1 * | 4/2001 | Chao | 370/316 |
| 6,392,705 B1 | 5/2002 | Chaddha | |
| 6,404,755 B1 | 6/2002 | Schafer | |
| 6,556,546 B1 | 4/2003 | Maeda et al. | |
| 6,574,794 B1 | 6/2003 | Sarraf | |
| 6,700,882 B1 * | 3/2004 | Lindoff et al. | 370/337 |
| 6,829,221 B1 * | 12/2004 | Winckles et al. | 370/238 |
| 6,934,679 B2 | 8/2005 | Zhou et al. | |
| 6,961,388 B2 | 11/2005 | Ling et al. | |
| 6,993,689 B2 | 1/2006 | Nagai et al. | |
| 6,999,432 B2 | 2/2006 | Zhang et al. | |
| 7,093,028 B1 | 8/2006 | Shao et al. | |

(Continued)

FOREIGN PATENT DOCUMENTS

WO    WO 2008/064270 A    5/2008

(Continued)

OTHER PUBLICATIONS

European Broadcasting Union: "Digital Video Broadcasting (DVB)"; Feb. 2005; ETSI TR 102 376 V1.1.1; pp. 1-104.

(Continued)

*Primary Examiner* — Ricky Ngo
*Assistant Examiner* — Dewanda Samuel
(74) *Attorney, Agent, or Firm* — Kilpatrick Townsend & Stockton LLP

(57) ABSTRACT

Methods, systems, and devices are described for determining a preferred routing path for communicating source data from a data source to a data terminal over a network having multiple routing path options. Embodiments include receiving a source dataset at a network node; determining multiple routing path options for routing the source dataset, each comprising a set of communication links that communicatively couple the data source with the data terminal; determining a hierarchical encoding scheme for encoding the source dataset to generate a transmission; generating routing path profiles for each routing path option by evaluating each routing path option against a routing metric; determining a preferred routing path for routing the transmission by comparing the routing path profiles; and routing the transmission over the preferred routing path according to the hierarchical encoding scheme.

34 Claims, 16 Drawing Sheets

U.S. PATENT DOCUMENTS

| | | | |
|---|---|---|---|
| 7,136,066 B2 | 11/2006 | Li et al. | |
| 7,146,185 B2 | 12/2006 | Lane | |
| 7,349,906 B2 | 3/2008 | Cherkasova | |
| 7,376,418 B2 | 5/2008 | Wells | |
| 7,382,729 B2 | 6/2008 | Honda et al. | |
| 7,450,901 B2 * | 11/2008 | Parkman | 455/12.1 |
| 7,477,597 B2 * | 1/2009 | Segel | 370/230 |
| 7,477,688 B1 | 1/2009 | Zhang et al. | |
| 7,505,480 B1 | 3/2009 | Zhang et al. | |
| 7,515,566 B2 | 4/2009 | Dale et al. | |
| 7,535,863 B2 | 5/2009 | Gin et al. | |
| 7,593,697 B2 | 9/2009 | Zhu et al. | |
| 7,603,075 B2 | 10/2009 | Barda | |
| 7,643,441 B2 * | 1/2010 | de La Chapelle et al. | 370/316 |
| 7,690,021 B2 | 3/2010 | Ng | |
| 7,720,136 B2 | 5/2010 | Friedman et al. | |
| 2002/0058478 A1 * | 5/2002 | de La Chapelle et al. | 455/13.4 |
| 2003/0112878 A1 * | 6/2003 | Kloper | 375/259 |
| 2003/0204630 A1 | 10/2003 | Ng | |
| 2003/0204850 A1 | 10/2003 | Ng et al. | |
| 2004/0071216 A1 | 4/2004 | Richardson et al. | |
| 2004/0093396 A1 | 5/2004 | Akune | |
| 2004/0208121 A1 | 10/2004 | Gin et al. | |
| 2004/0252725 A1 | 12/2004 | Sun et al. | |
| 2004/0253980 A1 | 12/2004 | Lane | |
| 2005/0152372 A1 * | 7/2005 | Kim et al. | 370/395.1 |
| 2005/0251838 A1 | 11/2005 | Chandhok et al. | |
| 2006/0050660 A1 | 3/2006 | Wells | |
| 2006/0126576 A1 | 6/2006 | Dale et al. | |
| 2006/0182026 A1 | 8/2006 | Zhu et al. | |
| 2007/0091881 A1 | 4/2007 | Kallio et al. | |
| 2007/0159521 A1 | 7/2007 | Lane | |
| 2008/0049597 A1 | 2/2008 | Walker et al. | |
| 2008/0049659 A1 | 2/2008 | Ram et al. | |
| 2008/0056145 A1 | 3/2008 | Woodworth | |
| 2008/0064323 A1 | 3/2008 | Barda | |
| 2008/0144713 A1 | 6/2008 | Kimmich et al. | |
| 2008/0144723 A1 | 6/2008 | Chen et al. | |
| 2008/0155373 A1 | 6/2008 | Friedman et al. | |
| 2008/0219266 A1 * | 9/2008 | Agarwal et al. | 370/392 |
| 2008/0259901 A1 | 10/2008 | Friedman et al. | |
| 2008/0268838 A1 | 10/2008 | Zufall et al. | |
| 2009/0003452 A1 | 1/2009 | Au et al. | |
| 2009/0028182 A1 | 1/2009 | Brooks et al. | |
| 2009/0041100 A1 | 2/2009 | Kimmich et al. | |
| 2009/0060033 A1 | 3/2009 | Kimmich et al. | |
| 2009/0060086 A1 | 3/2009 | Kimmich et al. | |
| 2009/0073876 A1 | 3/2009 | Kimmich et al. | |
| 2009/0135789 A1 | 5/2009 | Snapir et al. | |
| 2009/0219990 A1 | 9/2009 | Han et al. | |
| 2010/0008416 A1 | 1/2010 | Ben-Zedeff et al. | |
| 2010/0260043 A1 | 10/2010 | Kimmich et al. | |
| 2010/0260045 A1 | 10/2010 | Kimmich et al. | |
| 2010/0260050 A1 | 10/2010 | Kimmich et al. | |
| 2010/0260254 A1 | 10/2010 | Kimmich et al. | |
| 2010/0260259 A1 | 10/2010 | Kimmich et al. | |

FOREIGN PATENT DOCUMENTS

| | | |
|---|---|---|
| WO | WO 2008/074020 A | 6/2008 |
| WO | WO 2009/058118 A1 | 5/2009 |
| WO | WO 2009/154704 A1 | 12/2009 |

OTHER PUBLICATIONS

Application No. 12/250,394, Notice of Allowance mailed Mar. 5, 2010, 9 pages.

PCT International Search Report and Written Opinion mailed Feb. 20, 2009, International Application No. PCT/US2008/076038, 13 pages.

Han, et al., "Cross Layer Optimization for Scalable Video Multicast over 802.11 WLANs", Jan. 8, 2006; pp. 838-843; IEEE 2006 Consumer Communications and Networking Conference, 2006, Las Vegas, NV, USA.

Van Der Schaar, "Robust Transmission of MPEG-4 Scalable Video over 4G Wireless Networks", Sep. 22-25, 2002; pp. III-757-III-760; IEEE 2002 Proceedings 2002 International Conference on Image Processing, 2002, Rochester, NY, USA.

European Patent Office International Search Report and Written Opinion, Aug. 1, 2008, pp. 1-16, PCT/US2007/087483.

Horn, Uwe et al., "Scalable Video Coding for Multimedia Applications and Robust Transmission over Wireless Channels", Telecommunications Institute, Univ. of Erlangen-Nuremberg, Germany, no date, 6 pages.

McCanne, Steven et al., "Receiver-driven Layered Multicast", SIGCOMM, Stanford, CA, Aug. 1996, 14 pages.

Radha, Hayder M. et al., "The MPEG-4 Fine-Grained Scalable Video Coding Method for Multimedia Streaming Over IP", IEEE Transactions on Multimedia, vol. 3, No. 1, Mar. 2001, 16 pages.

Schierl, Thomas et al., "Mobile Video Transmission Using Scalable Video Coding", IEEE Transactions on Circuits and Systems for Video Technology, vol. 17, No. 9, Sep. 2007, 14 pages.

Schierl, Thomas et al., "Using H.264/AVC-based Scalable Video Coding (SVC) for Real Time Streaming in Wireless IP Networks", Heinrich-Hertz Institute, Berlin, Germany, no date, 4 pages.

International Search Report and Written Opinion mailed Aug. 1, 2008 for PCT/US2007/087483, 5 pages.

International Search Report and Written Opinion mailed Feb. 20, 2009 for PCT/US2008/076038, 3 pages.

Notice of Allowance for U.S. Appl. No. 12/250,394 mailed on Feb. 8, 2011; 9 pages.

Non-Final Office Action for U.S. Appl. No. 12/250,394 mailed on Sep. 14, 2010; 12 pages.

Notice of Allowance for U.S. Appl. No. 12/250,394 mailed on Aug. 4, 2010, 9 pages.

* cited by examiner

| Modulation and Coding Scheme | Identifier |
|---|---|
| QPSK 1/4 | 1 |
| QPSK 1/3 | 2 |
| QPSK 2/5 | 3 |
| QPSK 1/2 | 4 |
| QPSK 3/5 | 5 |
| QPSK 2/3 | 6 |
| QPSK 3/4 | 7 |
| QPSK 4/5 | 8 |
| QPSK 5/6 | 9 |
| QPSK 8/9 | 10 |
| QPSK 9/10 | 11 |
| 8PSK 3/5 | 12 |
| 8PSK 2/3 | 13 |
| 8PSK 3/4 | 14 |
| 8PSK 5/6 | 15 |
| 8PSK 8/9 | 16 |
| 8PSK 9/10 | 17 |
| 16APSK 2/3 | 18 |
| 16APSK 3/4 | 19 |
| 16APSK 4/5 | 20 |
| 16APSK 5/6 | 21 |
| 16APSK 8/9 | 22 |
| 16APSK 9/10 | 23 |
| 32APSK 3/4 | 24 |
| 32APSK 4/5 | 25 |
| 32APSK 5/6 | 26 |
| 32APSK 8/9 | 27 |
| 32APSK 9/10 | 28 |

ADAPTIVE CODING AND MODULATION AWARE NETWORK LOAD BALANCING

CROSS REFERENCE

The present application is a continuation-in-part of co-pending, commonly assigned U.S. patent application Ser. No. 11/956,200, filed on Dec. 13, 2007, and entitled "ACM AWARE ENCODING SYSTEMS AND METHODS," which claims the benefit of U.S. Provisional Application No. 60/869,809, filed on Dec. 13, 2006, entitled "ADAPTIVE CODING & MODULATION (ACM) AWARE ENCODER SYSTEM," the entirety of each of which is herein incorporated by reference for all purposes.

The present application is also related to U.S. patent application Ser. No. 12/192,544, filed on Aug. 15, 2008, and entitled "LINK AWARE MOBILE DATA NETWORK"; U.S. patent application Ser. No. 12/250,384, filed on Oct. 13, 2008, and entitled "PREDICTIVE ADAPTIVE CODING AND MODULATION"; and U.S. patent application Ser. No. 12/250,394, filed on Oct. 13, 2008, and entitled "TERMINAL AWARE MULTICASTING," the entirety of each of which is herein incorporated by reference for all purposes.

BACKGROUND

The present invention relates to data communications in general and, in particular, to adaptive coding and modulation.

Service providers may desire to use communication systems to provide high availability to high-quality services for their subscribers. When data is transmitted from one point in a network to another, the data may pass through a number of network elements. For example, data may be sent through a number of network access units (e.g., modems, antennae, etc.), a number of router modules (e.g., routers, DSLAMs, gateways, etc.), communication links between those and/or other units, etc.

Typically, conditions may differ across regions and elements of the network, which may affect the apparent availability or quality of communications with respect to various nodes of the network. For example, each communication link may have certain characteristics (e.g., bandwidth, throughput, error rate, etc.) and may experience different traffic patterns. Moreover, certain communication links may be oversubscribed in some cases. For example, a network provider may statistically oversubscribe network resources to account for different usage patterns throughout the network and/or over time. These and other regional network characteristics may create certain inefficiencies, like load imbalances, bottlenecks, and decreases in data integrity.

Many typical techniques for addressing these load imbalances include detecting affected areas of the network (e.g., bottlenecks) and routing data around those areas. However, it may be difficult to determine the optimal routing path for different types of data under different link conditions. Further, simply rerouting the data may not fully account for differences in links making up a given routing path to provide an optimal solution. For example, certain pre-coding, coding, and modulation techniques may be more or less conducive to certain link conditions.

As such, it may be desirable to provide methods and systems for handling load imbalances and other network conditions by using adaptive pre-coding, coding, and/or modulation techniques.

SUMMARY

Among other things, methods, systems, and devices are described for handling load imbalances and other network conditions by using adaptive pre-coding, coding, and/or modulation techniques. Embodiments determine a preferred routing path for communicating a source dataset from a data source to a data terminal over a network having multiple routing path options. The source dataset is then communicated over the preferred routing path or paths according to adaptive hierarchical encoding schemes. The preferred routing path may be determined as a function of the hierarchical encoding schemes, and/or the hierarchical encoding schemes may be determined as a function of preferred routing path characteristics.

In one set of embodiments, a method is provided for determining a preferred routing path. The method includes receiving a source dataset at a network node; determining multiple routing path options for routing the source dataset, each comprising a set of communication links that communicatively couple the data source with the data terminal; determining a hierarchical encoding scheme for encoding the source dataset to generate a transmission; generating routing path profiles for each routing path option by evaluating each routing path option against a routing metric; determining a preferred routing path for routing the transmission by comparing the routing path profiles; and routing the transmission over the preferred routing path according to the hierarchical encoding scheme.

In another set of embodiments, a network element is provided for use in a communications network providing multiple routing path options having at least a first routing path option and a second routing path option, the first routing path option having a first set of communication links and the second routing path option having a second set of communication links, the communications network being configured to adaptively communicate source data from a data source to a data terminal over at least one of the first routing path option or the second routing path option. The network element includes a transceiver module, communicatively coupled with a source communication link, at least one of the first set of communication links and at least one of the second set of communication links, and adapted to receive a source dataset over the source communication link, the source dataset comprising a functional representation of at least a portion of the source data; and a controller module, operable to generate a transmission as a function of the source dataset and to determine a preferred routing path for routing the transmission. The preferred routing path for routing the transmission may be determined by: generating a first routing path profile by evaluating at least a portion of the first routing path option as a function of a routing metric; generating a second routing path profile by evaluating at least a portion of the second routing path option as a function of the routing metric; determining a hierarchical encoding scheme for encoding at least a portion of the source dataset to generate the transmission; comparing the first routing path profile and the second routing path profile to determine a preferred routing path for the transmission; and applying the hierarchical encoding scheme to the at least a portion of the source dataset to generate the transmission, wherein the transceiver module is further adapted to communicate the transmission over the preferred routing path.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a lower-case character or a dash and a second label that distinguishes among the similar components. If only the first reference label is used in the specification, the description is applicable to any one of the similar components having the same first reference label irrespective of the second reference label.

FIG. 7 provides an illustration of an exemplary identifier table for use with various embodiments of the invention.

DETAILED DESCRIPTION OF THE INVENTION

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Among other things, the description provides methods, systems, and devices for handling load imbalances and other network conditions by using adaptive pre-coding, coding, and/or modulation techniques.

Figure 1:
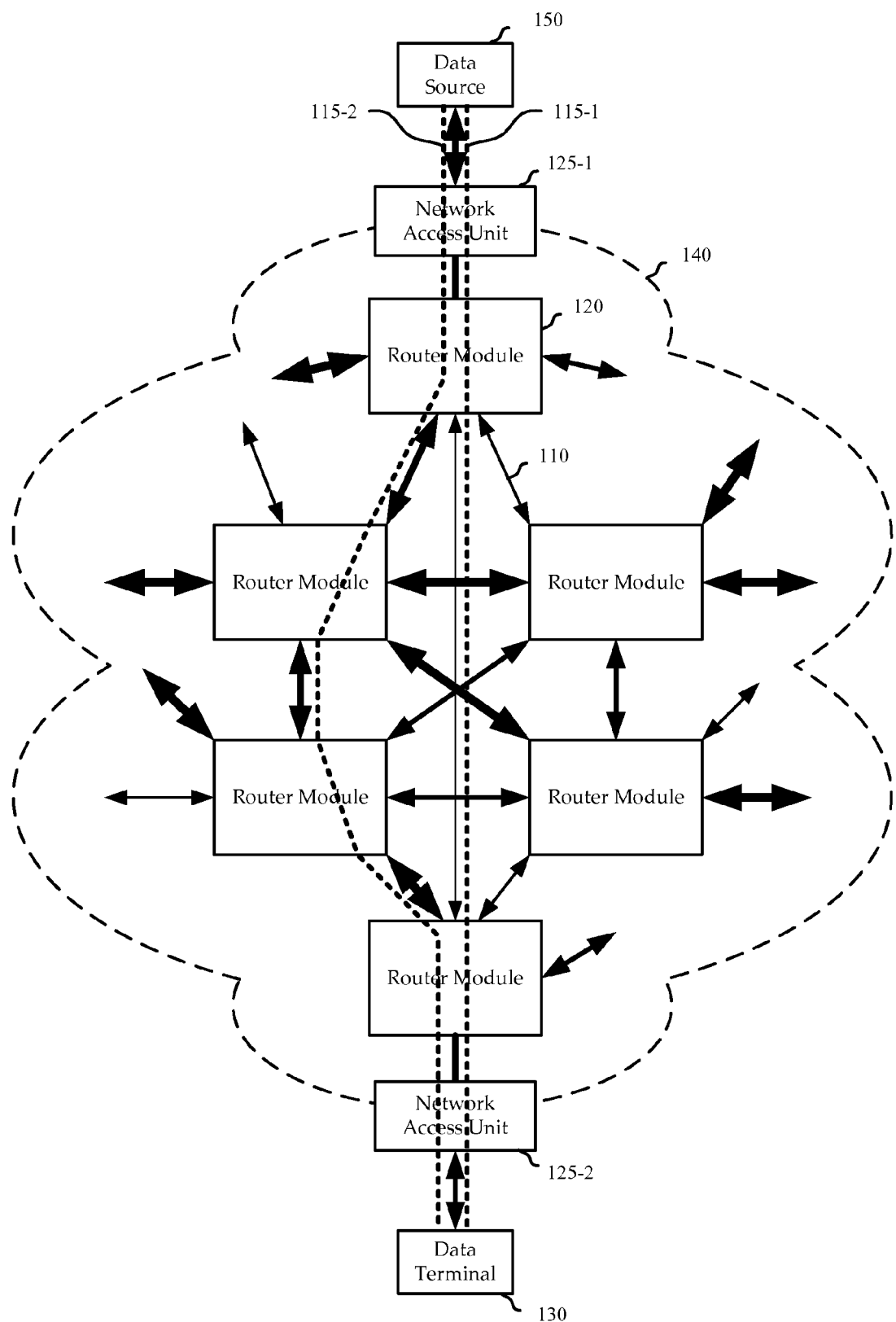
FIG. 1 shows a simplified network diagram for use with various embodiments of the invention.

Turning first to FIG. 1, a simplified network diagram is shown for use with various embodiments of the invention. A data source 150 (e.g., an application provider, etc.) may communicate data to a data terminal 130 (e.g., a computer, cell phone, etc.) over a network 140. The data source 150 and the data terminal 130 are communicate with the network 140 through network access points 125 (e.g., modems, antennae, etc.).

The network access points 125 are in communication with each other either directly or through one or more router modules 120. The router modules 120 may be any network element that receives network data from at least a first network element (e.g., a network access point 125 or another router module 120) and communicates the data to at least a second network element. For example, router modules 120 may include routers, DSLAMs, gateways, cells, etc.

Each network element is in communication with at least one other network element over one or more communication links 110. The communications links 110 may include any useful way of communicating data between network elements (e.g., wired or wireless). For example, the communication links 110 may include short-range wireless links, long-range wireless links, cellular links, optical links, wired links, parallel links, etc.

The communication links 110 are shown in FIG. 1 with different weight lines to represent differently sized pipes. It is worth noting that the phrase "pipe size," as used herein, is intended to include the effective data flow through a communication link, from any useful perspective. For example, a first path may have high bandwidth, but also high latency and high bit error rates. This pipe may be considered as having a smaller pipe size than a pipe with lower nominal bandwidth, but relatively high throughput due to very low bit error rates and latencies. As such, "pipe size" should be construed broadly as encompassing more than just a measurement of bandwidth or throughput.

In some embodiments, a service provider may desire to use the network 140 to provide high availability, high-quality communications between network elements. There may, however, be multiple possible routing paths 115 (e.g., physical and/or logical paths through at least one communication link) for routing the communications between two network elements, and each routing path 115 may have different characteristics. For example, each communication link 110 in a routing path 115 may have different bandwidth, throughput, error rate, traffic patterns, etc. Moreover, certain communication links 110 may be oversubscribed in some cases. For example, a network provider may statistically oversubscribe network resources to account for different usage patterns throughout the network 140 and/or over time.

In determining which routing path 115 to use, it may be desirable to account for these and other routing path 115 characteristics. In certain embodiments, the different routing paths 115 may have path-level differences (e.g., hop count, path length, etc.). In other embodiments, the different routing paths 115 may have link-level differences (e.g., bandwidth, packet error rate, signal strength, etc.). In still other embodiments, the different routing paths 115 may have different data environments (e.g., load imbalances, usage patterns, bottlenecks, protocol compatibilities, oversubscription, etc.). While certain of these issues may be addressed by selecting an appropriate physical or logical routing path 115 (e.g., routing around a bottleneck), others may not.

For example, two alternate routing paths 115 in the network 140 from a first network access unit 125-1 to a second network access unit 125-2 have the same nominal bandwidth, but the first routing path 115-1 has a hop count of three (i.e., it takes three communication links 110 to get from the first network access unit 125-1 to the second network access unit 125-2) and the second routing path 115-2 has a hop count of five. Typically, it may be determined that, given the same nominal bandwidth, the path with the smaller hop count (i.e., the first routing path 115-1) should be selected for traffic routing.

Notably, however, looking only at nominal bandwidths, hop counts, and certain other characteristics may yield a sub-optimal determination. In some cases, it may be desirable to determine whether the data being communicated may be adapted to exploit certain characteristics, for example, to increase the effective bandwidth of a communication link 110 or its throughput. In some embodiments, adaptive communication techniques, like adaptive coding and modulation ("ACM") aware techniques, may dynamically adjust pre-coding, coding, and modulation schemes to adapt to these differing link conditions. For example, in a communication link 110 with low data integrity, a lower order (i.e., more reliable) data coding and modulation scheme may be applied, effectively sacrificing throughput (e.g., by adding overhead or redundancy) in exchange for more reliable communication of data through the link.

By way of example, the same two illustrative routing paths 115 discussed above (i.e., the first routing path 115-1 and the second routing path 115-2) may be reevaluated considering ACM aware encoding techniques. Recall that the first routing path 115-1 may typically be selected, as it exhibits the same nominal bandwidth as the second routing path 115-2, but with a smaller hop count. However, it may be determined that, at the time certain data is being communicated, the first routing path 115-1 has a much higher bite error rate than the second routing path 115-2. Based on that determination, adaptive techniques may be used to send data through the second routing path 115-2 with much lower overhead (e.g., error correction data, redundancy, etc.). As such, the effective size of the pipes in the second routing path (e.g., the throughput of the links) may be made so much larger as to compensate for affects of the larger hop count.

Table 1 (below) provides a purely exemplary set of data to further clarify the trade-off between availability and bandwidth efficiency. As such, the data in Table 1 should not be construed as limiting the scope of the invention. Referring to Table 1, the leftmost column shows the availability of an exemplary communication system ranging from 99% to 99.99%. The remaining columns, from left to right, show metrics relating to the link margin, signal-to-noise ratio, coding and modulation scheme, and bandwidth efficiency of the exemplary communication system, respectively. As illustrated by Table 1, lower order coding and modulation schemes are used to increase availability of the network (i.e., the coding and modulation scheme is changed from 16APSK 3/4 to QPSK 3/4 to increase availability from 99% to 99.99%). The illustrative result shows a decrease in bandwidth efficiency from 2.97 to 1.32, almost a 60% decrease in bandwidth efficiency.

TABLE 1

Availability vs. Bandwidth Efficiency

| Availability | Link Margin (dB) | Operating Es/No (dB) | Selected Coding and Modulation Scheme | Bandwidth Efficiency |
|---|---|---|---|---|
| 99% | 0.53 | 10.67 | 16APSK 3/4 | 2.97 |
| 99.9% | 2.33 | 8.87 | 8PSK 3/4 | 2.23 |
| 99.99% | 7.19 | 4.01 | QPSK 3/4 | 1.32 |

It will be appreciated that the ACM Aware (or other adaptive) functionality may be implemented in any useful location within (or outside) the network. In some embodiments, each router module 120 is adapted to evaluate the characteristics of some or all of the communication links 110 in communication with the router module 120. This information may then be used by the router module 120 to determine how to adaptively encode (e.g., precode, code, and/or modulate) the data. In some embodiments, the encoding determination is made by the router module 120, while in other embodiments, data is passed to another component or system adapted to make the encoding determination.

In some embodiments, each router module 120 may use hierarchical pre-coding schemes at least in part to mitigate the trade-off between availability and bandwidth efficiency (e.g., in an effort to handle network load imbalances). In certain embodiments, hierarchical pre-coding schemes may include simulcasting (simultaneously broadcasting) multiple versions of a set of source data (e.g., standard- and high-definition versions of a video stream). In other embodiments, hierarchical pre-coding schemes may include scalable pre-coding schemes, data partitioning schemes, and other pre-coding schemes, as described below. In certain embodiments, the hierarchically pre-coded data may be adaptively coded and/or modulated for transmission over the communication link in a layered fashion. In this way, it may be possible to affect either or both of availability and bandwidth efficiency per each hierarchical data layer, adding flexibility to the network 140.

In certain embodiments, each router module 120 uses either or both of ACM and hierarchical pre-coding schemes. In one example, multiple hierarchical layers are created, but a single coding and modulation scheme is used for all the layers. In another example, a single layer may be sent using multiple coding and modulation schemes. In other embodiments, each router module 120 pre-codes, codes, and/or modulates only a portion of the data. For example, a particular router module 120 may detect that only enough bandwidth is available to transmit a single layer over the communication link. In this case, it may be efficient for the router module 120 to generate only a single layer for some or all of the source data.

It will be appreciated that the same or similar techniques described with regard to FIG. 1 may be applied, according to embodiments of the invention, to any type of network 140 having differing communication link 110 conditions and multiple alternate routing paths 115 between elements. For example, in one embodiment, the network 140 includes a satellite communication network in which the network access units 125 are gateways, adapted to transmit information to satellite transceivers in communication with data sources 150 and data terminals 130. The data terminals 130 in the illustrative embodiment may include, for example, satellite telephones, global positioning satellite ("GPS") units, satellite radios, etc.

In another embodiment, the network 140 includes a cellular communication network in which the network access units 125 are cells, adapted to transmit information to cellular transceivers in communication with data sources 150 and data terminals 130 (e.g., cell phones). In yet other embodiments, the network 140 includes other types of networks, including local area networks, wide area networks, secure networks, the Internet, etc.

Figure 2:
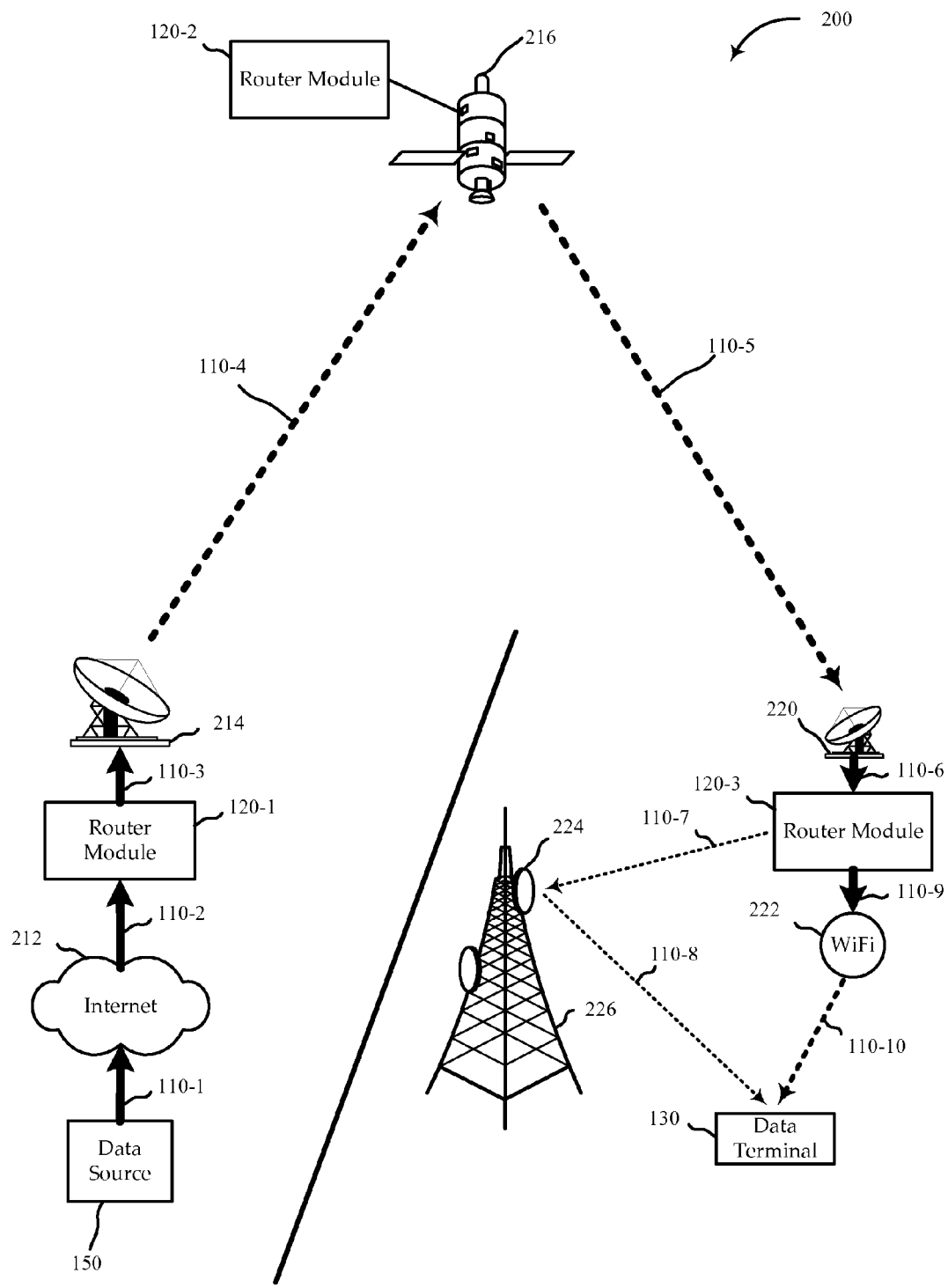
FIG. 2 shows a network with multiple routing paths having communication links of varying pipe size, according to various embodiments of the invention.

By way of illustration, FIG. 2 shows a network with multiple routing paths having communication links of varying pipe size, according to various embodiments of the invention. As in FIG. 1, a data source 150 communicates data to a data terminal 130 over one or more networks. The data source 150 and the data terminal 130 communicate over one or more network through various network access points (e.g., modems, antennae, gateways, cells, etc.). The network access points are in communication over multiple communication links 110 communicatively coupling multiple network elements, including multiple router modules 120.

It will be appreciated that some or all of the functionality of router modules 120 may be implemented in various parts of the network. In some embodiments, various network elements, like transceivers or nodes, include router modules 120. In the embodiment shown in FIG. 2, a first router module 120-1 is in communication with a first satellite transceiver 214, a second router module 120-2 is in communication with a satellite 216, and a third router module 120-3 is in communication with a second satellite transceiver 220.

In one embodiment, source data is transmitted from the data source 150 over a first communication link 110-1 (e.g., the data provider's access network) to the Internet 212. The Internet may typically include many network access points (not shown) and many router modules 120 (not shown), some or all of which having differing link conditions. The source data and multiple other origination nodes may then be communicated over a second communication link 110-2, aggregated at the first router module 120-1, and communicated over a third communication link 110-3 with the first satellite transceiver 214. Some or all of the aggregated data, may then be communicated up to the satellite 216 over a fourth communication link 110-4, which may further aggregate data coming from other sources (e.g., other satellite transceivers) using a second router module 120-2. This data may then be communicated back down to the second satellite transceiver 220 over a fifth communication link 110-5, and to a third router module 120-3 over a sixth communication link 110-6.

From the third router module 120-3, data may follow one of two alternate routing paths. In the first routing path, data is communicated from the third router module 120-3 to a cell 224 on a cell tower 226 over a seventh communication link 110-7. Data may then be communicated over an eight communication link 110-8 to a cellular receiver in communication with the receiving data terminal 130. Alternately, in the second routing path, data is communicated from the third router module 120-3 to a WiFi router 222 over a ninth communication link 110-9. Data may then be communicated over a tenth communication link 110-10 in the WiFi network to a compatible receiver in communication with the receiving data terminal 130.

It will be appreciated that embodiments of the invention are not limited to the illustrative embodiments of networks, systems, elements, data sources and terminals, and other elements shown in FIGS. 1 and 2. For example, the functionality and methods of embodiments of the invention may be implemented in many systems and components, and the systems and components may be used to implement many embodiments of the various functions and methods of the invention.

Figure 3:
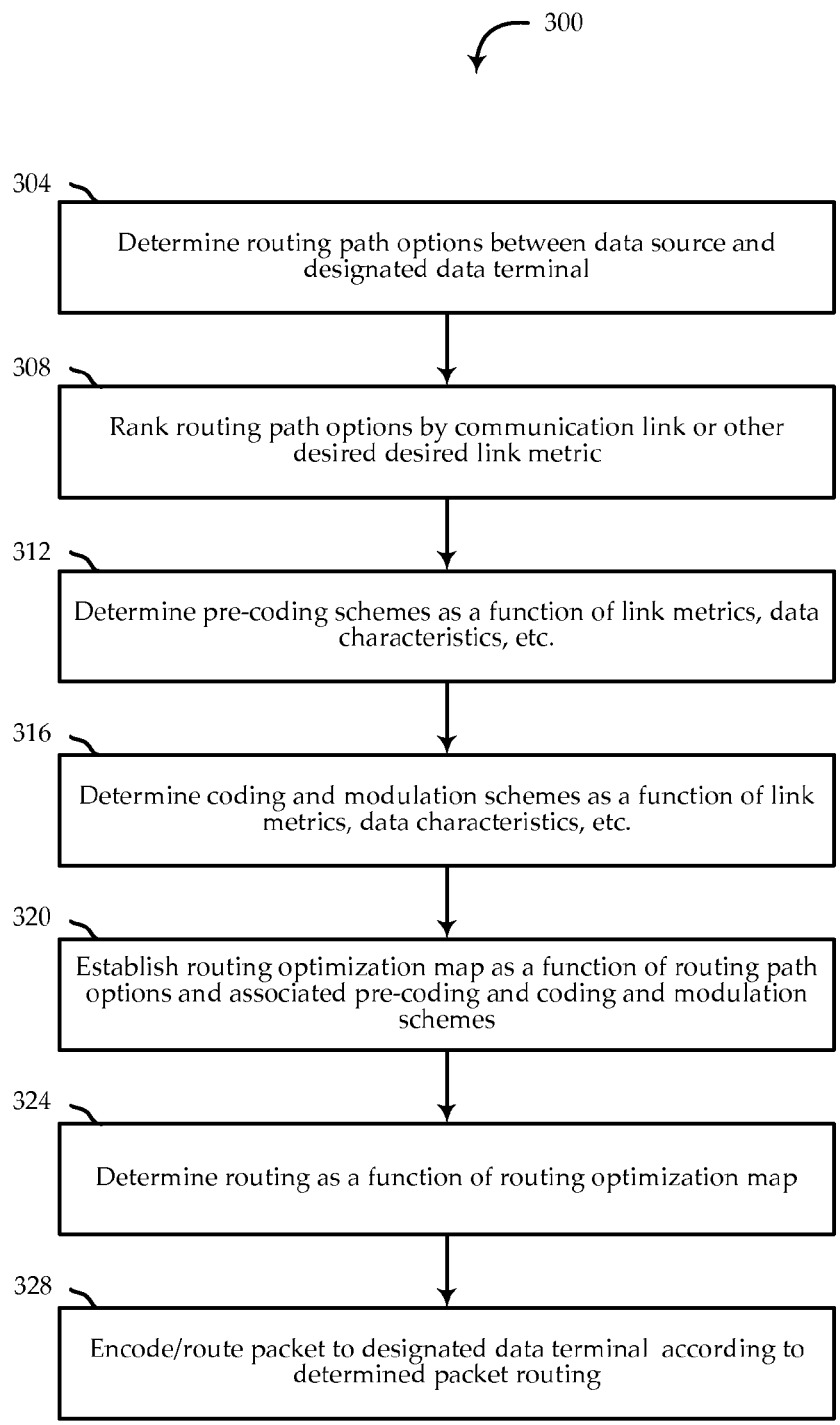
FIG. 3 shows an illustrative flow diagram of embodiments of methods for handling network load imbalances using ACM Aware encoding techniques, according to various embodiments of the invention.

FIG. 3 shows an illustrative flow diagram of embodiments of methods for handling network load imbalances using ACM Aware encoding techniques, according to various embodiments of the invention. The illustrative method 300 is described with reference to a generic communication network, like the one shown in FIG. 1. The network includes one or more network access units in communication with each other through a network of communication links. The network of communication links effectively provides multiple alternate routing paths for communicating source data between a data source and a designated data terminal.

The method 300 begins at block 304 by determining routing path options between the data source and the designated data terminal. For example, the network may be polled, tracked, or otherwise evaluated to determine some or all of the potential paths between the data source and the designated data terminal. In some embodiments, only a subset of all the possible routing paths is examined as a result of certain parameters or characteristics (e.g., no routing paths are evaluated with higher than a certain hop count, no routing paths are evaluated where any communication links are controlled by a third party, etc.).

Each determined routing path option may then be evaluated and/or ranked according to some parameter or characteristic at block 308. For example, each routing path may be evaluated (e.g., as a whole, link-by-link, etc.) to determine bandwidths, latencies, cost per bit, bit error rates, and/or any desired link or path characteristic. In certain embodiments, the evaluated routing paths are then ranked according to the determined characteristics. In other embodiments, certain routing paths are removed from consideration (e.g., all but the best three routing path options according to the evaluation in block 208 are removed from consideration).

At block 312, one or more pre-coding schemes are determined for pre-coding the source data. In some embodiments, the pre-coding schemes are determined link-by-link for each routing path option under consideration. In other embodiments, the pre-coding schemes are determined as a function of the source data.

At block 316, one or more coding and modulation schemes are determined for coding and modulating the source data. In some embodiments, the coding and modulation schemes are determined link-by-link for each routing path option under consideration. In other embodiments, the coding and modulation schemes are determined as a function of the source data. In still other embodiments, the coding and modulation schemes are determined as a function of the pre-coding schemes, and/or the pre-coding schemes are determined as a function of the coding and modulation schemes. Various embodiments use pre-coding, coding, and/or modulation schemes in various ACM aware encoding techniques, as described more fully below and according to various embodiments of the invention.

A routing optimization map is generated at block 320 as a function of some or all of the information determined and/or generated in preceding blocks of the method 300. In some embodiments, the routing map is a set of data providing routing parameters, instructions, characteristics, etc. for the various communication links in each of the routing paths under consideration. For example, pre-coding, coding, and or modulation schemes may be determined for each link in blocks 312 and 316 and mapped in block 320 for use in understanding more macroscopic routing information (e.g., the characteristics of each entire routing path, of certain network regions, etc.).

It will be appreciated that any useful information may be exploited in generating the routing optimization map in block 320. In some embodiments, the type of data being communicated is considered in generating the routing optimization map. For example, the routing optimization map may be generated partly as a function of various data types, protocols, sizes, priorities, security, and/or other parameters. In other embodiments, characteristics of one or more network elements in the routing paths are considered in generating the routing optimization map. For example, the routing optimization map may be generated partly as a function of buffering capabilities (e.g., if a router module includes memory storage modules for buffering data, etc.), signal strength and integrity (e.g., if a data terminal or other element is mobile and has intermittent or unreliable connectivity, etc.), antenna type, entitlements (e.g., if certain network elements are authorized to communicate certain types of data or data from certain parties, etc.), cost (e.g., if certain routing paths or communication links vary in terms of cost per bit, tariffs, etc.), etc.

The routing optimization map generated in block 320 may then be used to determine an appropriate (e.g., a preferred, optimal, etc.) data routing in block 324. In various embodiments, the routing may be determined by entire routing path, or for a particular network region, communication link, data packet, hierarchical representation data set, etc. In certain embodiments, the routing determination includes information as to which communication links to choose to define the determined routing path for the source data.

In block 328, all or a portion of the source data may be routed according to the routing determination made in block 324. For example, each packet or groups of packets comprising the source data may be routed as a function of the routing determination. In some embodiments, routing the source data includes encoding the source data by applying some or all of the pre-coding, coding, and/or modulation schemes determined in blocks 312 and 316. In other embodiments, other data processing may be performed to prepare the data for, or to affect, the routing. For example, data may be split or multiplexed, filtered or sorted, encrypted, compressed, etc.

In certain embodiments, pre-coding schemes determined in block 312 may be applied to the source data to generate sets of representation data. As discussed more fully below, embodiments of the invention use hierarchical pre-coding schemes, resulting in hierarchical representation sets of the source data. For example, a first pre-coding scheme may generate a base layer of the source data (e.g., the most basic information needed to be able to recreate the source data at some resolution or fidelity), and a second pre-coding scheme may generate an enhancement layer of the source data (e.g., additional information useful for enhancing the recreation of the source data, like data for increasing resolution or color depth). It will be appreciated that any number of pre-coding schemes may be used, according to embodiments of the invention. For example, additional enhancement layers may be generated for additional hierarchical representations of the source data.

Coding and modulation schemes determined at block 316 may then be associated with the representation data sets. In some embodiments, a first coding and modulation scheme is applied to a first representation data set and a second coding and modulation scheme is applied to a second representation data set. In other embodiments, a signal coding and modulation is applied to multiple representation data sets. In still other embodiments, multiple coding and modulation schemes are applied to single representation data sets. It will be appreciated that these and other techniques may be used to generate a hierarchical encoding of the source data.

In some embodiments, portions of the source data are routed differently according to the routing determination. For example, where multiple representation data sets are generated by applying pre-coding schemes to the source data, each representation data set may be associated with a separate routing determination. It is worth noting that certain communication links in a routing path may be more or less conducive to or impacted by characteristics of communications through those links. As such, embodiments of appropriate routing determinations may account for these communication link differences in both determining and applying various schemes and algorithms to all or part of the source data.

It will be appreciated that some embodiments of the routing determination include other types of information relating to the routing of the source data. In one embodiment, as a function of the routing determination that was made, parameters of the data communication are adjusted at various points in the routing path. For example, protocols, security, pre-coding schemes, coding and modulation schemes, compression, etc. may be adjusted at some or all of the network nodes to optimize communications over the proceeding communication link. In certain embodiments, some or all of the routing determination information is sent with the source data (e.g., as part of the data protocol). In other embodiments, some or all of the routing determination information is communicated to nodes of the network (e.g., to some or all of the router modules).

It will be appreciated that many types of systems, methods, devices, software, etc. are possible for providing the functionality described above with reference to FIGS. 1-3. Some embodiments include systems and/or methods for providing ACM-aware hierarchical encoding for handling network load imbalances and/or other network issues, as shown in FIGS. 4-12. These systems and methods are provided for illustrative purposes only and should not be construed as limiting the scope of the invention.

Figure 4:
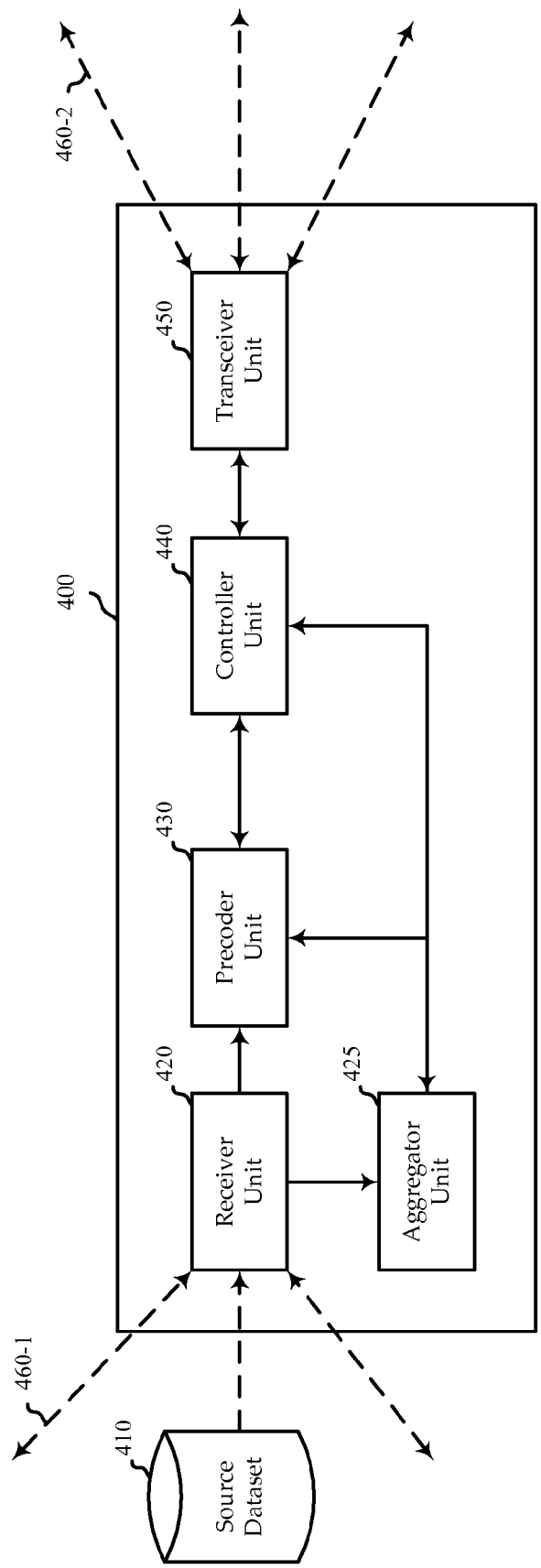
FIG. 4 provides a simplified block diagram of a device configured according to various embodiments of the invention.

FIG. 4 provides a simplified block diagram of an embodiment of a router module 400 (e.g., like the router modules 120 of FIGS. 1 and 2), configured according to various embodiments of the invention. It is worth noting that the functionality of the router module 400 may be implemented in any number of different ways. In some embodiments, the router module 400 includes a receiver unit 420, a pre-coder unit 430, a controller unit 440, and a transceiver unit 450. The router module 400 may receive one or more sets of source data 410 over one or more communication links 460, process the data using various components, and transmit the data over the same or one or more other communication links 460.

In some embodiments, the router module 400 includes the receiver unit 420, which receives the set of source data 410. The set of source data 410 may include, for example, audio data, video data, voice data, or any other type of data. The receiver unit 420 may include any hardware, software, or other components necessary to receive the set of source data 410. For example, the receiver unit 420 may include amplifiers, buffers, ports, codecs, etc. In one embodiment, the set of source data 410 includes an audio-visual data stream, which is received by the receiver unit 420 from a data network through a data port.

The receiver unit 420 may pass all or a portion of the set of source data 410 to the pre-coder unit 430. The pre-coder unit 430 may pre-code the portion of the set of source data 410 to generate sets of representation data. The sets of representation data may contain any type of information, including information extracted or adapted from the set of source data 410, which is useful for generating a representation of the set of source data 410. For example, a set of representation data may contain enough information extracted from a source video stream to allow the generation of a lower-resolution version of the video stream. In another example, the set of representation data may include color or texture information, which may be added to other sets of representation data to generate an enhanced version of the source video stream.

In certain embodiments, the pre-coder unit 430 applies certain pre-coding schemes, including scalable pre-coding schemes, data partitioning schemes, etc. In one embodiment, where the set of source data 410 includes an audio-visual data stream, the pre-coder unit 430 may pre-code the audio-visual data stream into various hierarchical sets of representation data by using the scalable capabilities of the MPEG-4 standard. In another embodiment, where the set of source data 410 includes an audio-visual data stream, the pre-coder unit 430 may pre-code the audio-visual data stream into various hierarchical sets of representation data by using the data partitioning capabilities of the H.264 adaptive video coding standard. Embodiments of pre-coding schemes are described more fully below.

In some embodiments, multiple pre-coding schemes may, in reality, be implemented as multiple functions of a single pre-coding scheme. In one embodiment, multiple scalable pre-coding schemes are implemented by using a single MPEG-4 pre-coding algorithm to generate multiple layers of output (i.e., the generation of a base layer and enhancement layers using MPEG-4 may be inextricably linked). In another embodiment, multiple data partitioning pre-coding schemes are implemented by using one data partitioning algorithm to slice the set of source data 410 into multiple data partitions. As such, it will be appreciated that phrases like "multiple pre-coding schemes" and "a first pre-coding scheme" should be broadly construed to encompass at least single pre-coding schemes capable of producing multiple different outputs.

The sets of representation data may be passed from the pre-coder unit 430 to the controller unit 440, which may associate each set of representation data with a coding and modulation scheme. For example, a first set of representation data may correspond to first-level (e.g., low resolution) playback of the set of source data 410, and a second set of representation data may correspond to second-level (e.g., higher resolution, enhanced) playback of the same set of source data 410. The controller unit 440 may associate the first set of representation data with a lower order coding and modulation scheme (e.g., quadrature phase-shift keying with 1-to-4 forward error correction (QPSK 1/4)) to better ensure the transmission of data for at least first-level playback. The controller unit 440 may associate the second set of representation data with a higher order coding and modulation scheme (e.g., 8PSK 7/8), reducing the transmission reliability of less critical enhancements for savings in power and bandwidth. Embodiments of coding and modulation schemes are described more fully below.

In some embodiments, the controller unit 440 may be configured to control all or some of the operations of the pre-coder unit 430. For example, the controller unit 440 may determine certain parameters which the pre-coder unit 430 may use to pre-code the set of source data 410. In one embodiment, the controller unit 440 determines a set of scaling parameters for the pre-coder unit 430 to use with a scalable pre-coding scheme to generate sets of representation data. It will be appreciated that the controller unit 440 may determine how to control the pre-coder unit 430 based on different types of information (communication link characteristics, etc.).

Some embodiments of the router module 400 further include an aggregator unit 425. The aggregator unit 420 may be adapted to perform functions relating to aggregating and/or buffering data received by the receiver unit 420. For example, where more than one set of source data 410 is received (e.g., where multiple representation data sets are received over different communication links), some or all of the sets of data may be aggregated (e.g., multiplexed, combined, etc.) by the aggregator unit. In some embodiments, the aggregator unit is adapted to buffer and/or store data to support functionality of other components of the router module 400. For example, data may be received more quickly than it may be processed in certain cases, such that buffering the data may allow the processing of the data to occur more reliably. In certain embodiments, the aggregator unit 425 is in communication with the pre-coder unit 430 and/or the controller unit 440.

The controller unit 440 may pass the aggregated, pre-coded, coded, and/or modulated data to a transceiver unit 450. The transceiver unit 450 may process the data into one or more signals for transmission (e.g., by buffering or amplifying the data), and may pass the signal to one or more communication links 460. The transceiver unit 450 may include any hardware, software, or other components necessary to transmit the signals or to interface with the communication links 460.

Figure 5:
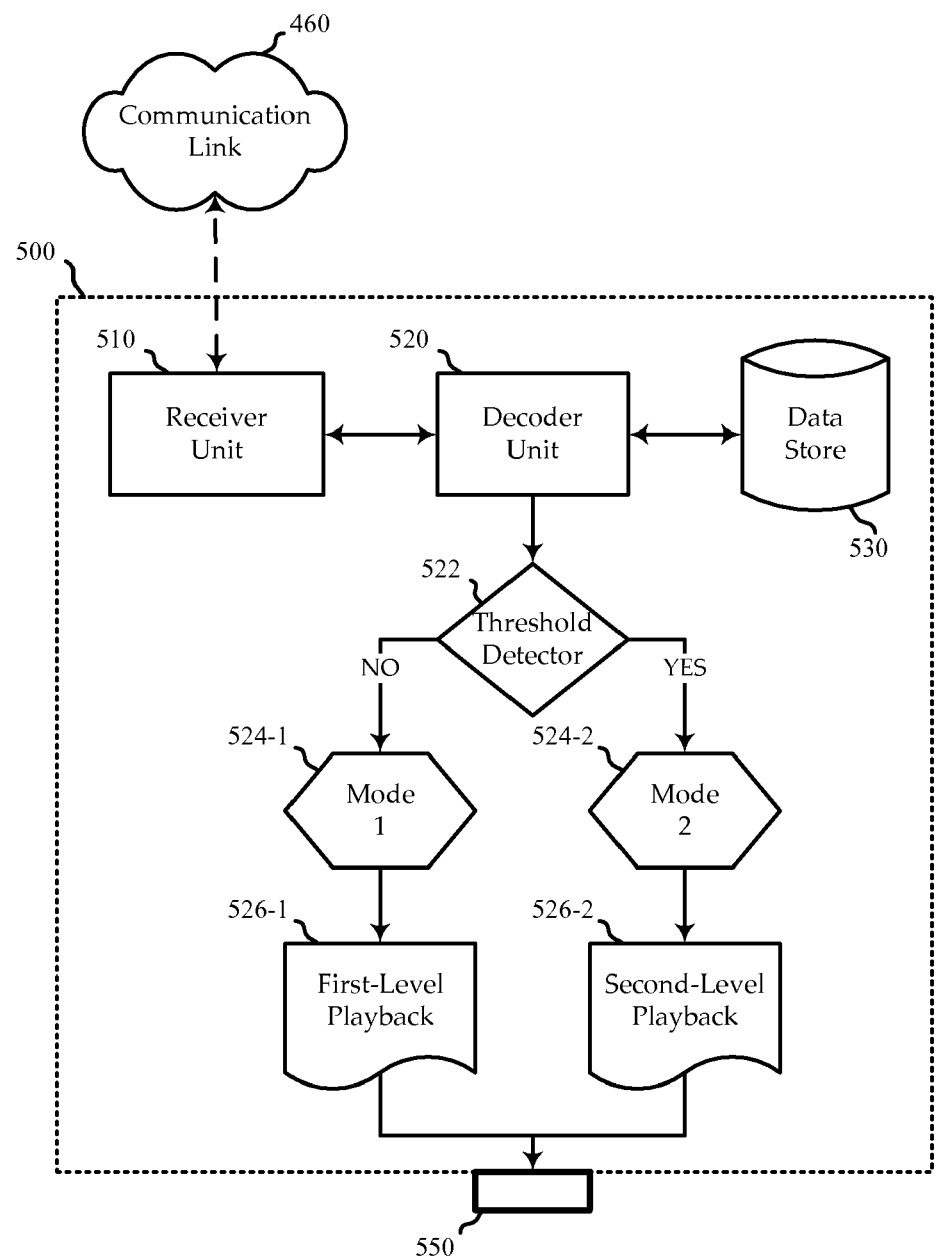
FIG. 5 provides a simplified block diagram of a subscriber terminal according to various embodiments of the invention.

In some embodiments, signals are transmitted by the router module 400 over the communication links 460 to one or more data terminals. FIG. 5 provides a simplified block diagram of an embodiment of a data terminal 500 according to various embodiments of the invention. The data terminal 500 may receive signals from one or more communications links 460 and decode the signals, for example for playback.

In some embodiments, signals are received by the data terminal 500 at a receiver unit 510. The receiver unit 510 may include any hardware, software, or other components necessary to receive the signals. The received signals may include the sets of representation data generated by a router module (e.g., router module 120 of FIG. 1) and transmitted by the transceiver unit 450 in FIG. 4. Depending on various link conditions, some sets of representation data may not be reliably received.

In poor link conditions (e.g., heavy rain), higher order coding and modulation schemes may fail to provide reliable signal transmission over the communication link 460. For example, signals may be corrupted in transmission, arriving at the data terminal 500 with low power, high bit error rates, low signal-to-noise ratios, etc. As such, in certain link conditions, sets of representation data transmitted using lower order coding and modulation schemes may be reliably transmitted to the data terminal 500, while other sets of representation data may fail to be reliably transmitted.

Received signals may be passed to a decoder unit 520 for decoding. It will be appreciated that certain amounts and types of data may need to be extracted from the signals to permit decoding. Thus, signals which fail to be reliably received by the receiver unit 510 may also fail to be decoded reliably by the decoder unit 520. Of course, the decoder unit 520 may include any hardware, software, or other components helpful for decoding data in various conditions. For example, the decoder unit 520 may have access to various error correction, de-multiplexing, formatting, and other routines.

In some embodiments, the data terminal 500 may be capable of decoding received signals in multiple modes 524. The modes 524 may relate, for example, to decoding for different levels of playback. In certain embodiments, modes 524 may be determined based in part on which sets of representation data are received, and whether enough data from those sets is reliably received, so the data may be decoded by the decoder unit 520. When sufficient data is received from a particular set of representation data, the mode 524 may switch to utilize that data. The data terminal 500 may use one or more of the modes 524 as a default, and be able to switch to other modes 524 either manually or automatically.

In some embodiments, the decoder unit 520 includes a threshold detector 522, which detects whether enough data is being reliably received to allow the decoder unit 520 to provide higher level playback. Because different sets of representation data may be transmitted using different coding and modulation schemes, some sets of representation data (e.g., those transmitted with higher order coding and modulation schemes) may fail to be reliably received by the data terminal 500 under certain link conditions. Depending on whether the threshold is being met, the decoder unit 520 may be configured to provide different levels of playback by decoding signals in different modes 524.

In one embodiment, a first set of representation data (representing low level playback of a set of source data) is transmitted with a very low order coding and modulation scheme. In this way, the first set of representation data may almost always be reliably received by the data terminal 500. The reliable receipt of the first set of representation data also means that the decoder unit 520 may almost always be able to decode sufficient information to generate a set of low level playback data. As such, the decoder unit 520 may be configured to operate by default in a first mode 524-1. In this first mode 524-1, the decoder unit 520 may decode only those signals which provide the first set of representation data, providing a subscriber with the ability for low level playback 526-1 at almost all times.

In this embodiment, at times, signals are received by the data terminal 500 which contain a second set of representation data. This second set of representation data (representing high level playback of a set of source data) may be transmitted with a higher order coding and modulation scheme, making its receipt less reliable in some link conditions. The threshold detector 522 may monitor the received signals to determine whether some threshold amount of the second set of representation data is being reliably received. When the threshold amount of the second set of representation data is not being reliably received, the data terminal 500 may remain in mode 1 524-1. When the threshold detector 522 detects that the threshold amount of the second set of representation data is being reliably received, the data terminal 500 may enter mode 2 524-2. In mode 2 524-2, the decoder unit 520 may generate a set of second-level playback data 526-2.

It will be appreciated that other numbers and types of modes 524 are possible, and the modes 524 may be implemented in different ways. In some embodiments, different levels of playback data include base and enhancement layers of a single data type (e.g., layers of an image). In other embodiments, different levels of playback data include different types of data to be combined for playback (e.g., text versus images versus videos on a webpage). It will be further appreciated that modes 524 may be selected manually, or as a result of other conditions, and may be implemented in hardware or software.

The decoder unit 520 may generate a set of playback data 526 to allow different levels of playback of the source data. The generated set of playback data 526 may be output to playback or other equipment or components (e.g., a display, sound card, etc.), for example, through a port 550. It will be appreciated that the set of playback data 526 may be further processed or other hardware, software, etc. may be provided to interface with different types of ports 550, devices, systems, and/or components.

In other embodiments, the data terminal 500 may include a data store 530, which may be communicatively coupled with the decoder unit 520. The data terminal 500 may be configured to save data decoded by the decoder unit 520 in the data store 530 either all the time or on certain conditions. In one embodiment, a subscriber manually selects times when data should be stored in the data store 530 for later playback.

In certain embodiments, data is automatically stored in the data store 530 based on the signal quality of the received signals. At certain times (e.g., in certain weather, because of bandwidth constraints, or due to other link conditions), only a portion of the sets of representation data relating to a particular set of source data may be reliably received by the data terminal 500. At these times, it may be desirable to accumulate related data in the data store 530 as it is received. It will be appreciated that many ways to accumulate related data in the data store 530 are known in the art. For example, a relational database may be used, which stores each decoded dataset in relation to the set of source data to which it relates. In these embodiments, it may be possible to store the first set of representation data while link conditions are poor, and wait to receive additional sets of representation data when link conditions improve.

In some embodiments, the data terminal 500 may generate notifications relating to which sets of representation have been received, decoded, and/or stored. In one embodiment, a subscriber may set the data terminal 500 to automatically generate a notification when at least two sets of representation data have been stored in the data store 530 relating to a particular set of source data. In another embodiment, the data terminal 500 may periodically send notifications to a service provider requesting transmission (or re-transmission) of certain sets of representation data. For example, if a set of representation data fails to be reliably received, the data terminal 500 may notify the sender to retransmit the set of representation data, possibly using a lower mode coding and modulation scheme.

It will now be appreciated that many embodiments and configurations of the router module 120 and the data terminals 500 are possible according to the invention. Further, it will be treated that certain functionality has been described with regard to specific elements, but may be implemented in any useful element, according to embodiments of the invention. For example, certain functions of the data terminals 500 may be implemented in one or more router modules 120.

These and other embodiments may be further understood with regard to various block diagrams, like those shown in FIGS. 6-10. It will be appreciated that while components and functions are described with relation to specific devices or functional blocks, the various functions may be implemented in many ways according to the invention. As such, the block diagrams are purely illustrative and should not be construed as limiting the scope of the invention.

Figure 6A:
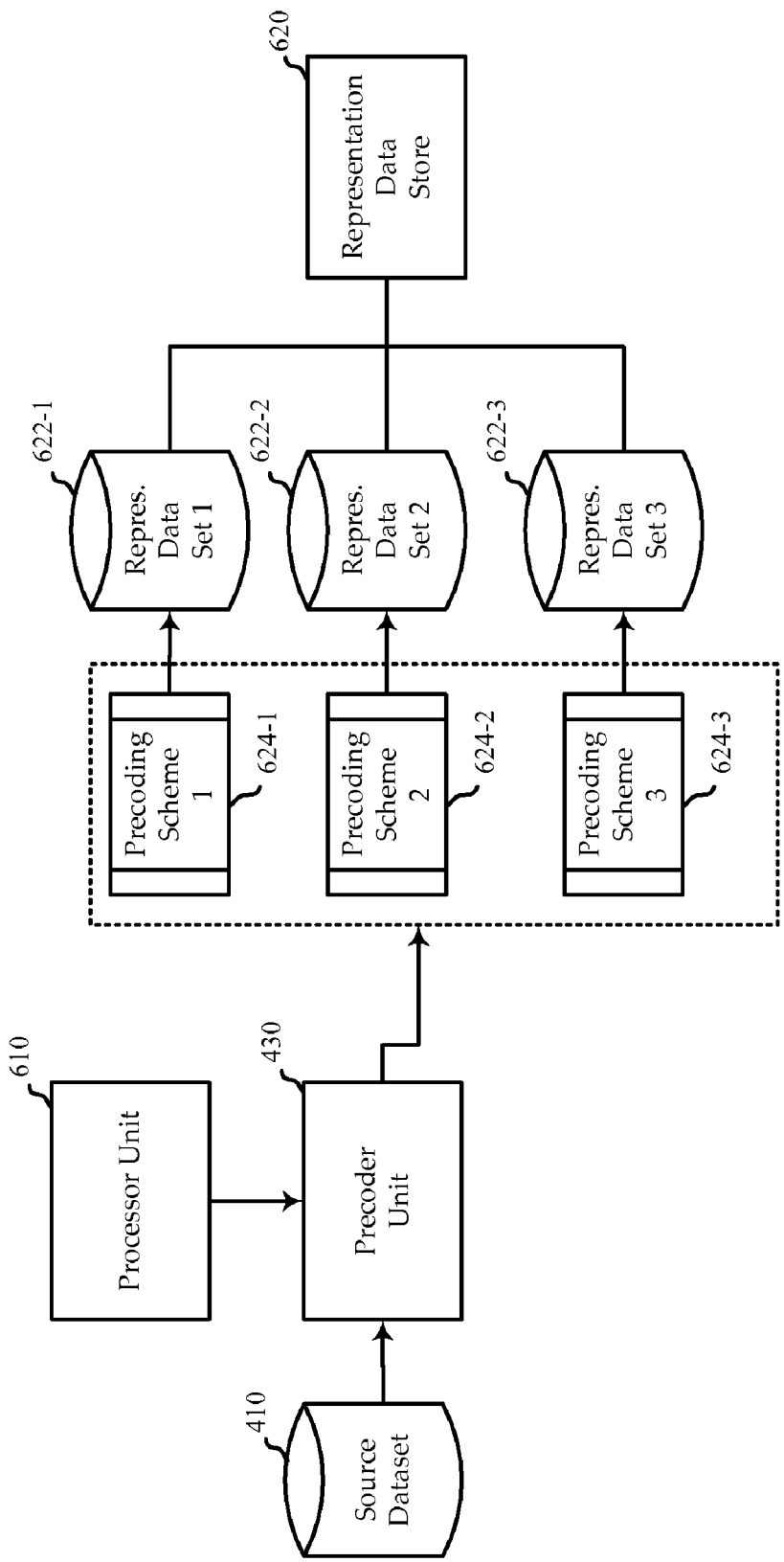
FIG. 6A provides a functional block diagram incorporating a pre-coder unit according to various embodiments of the invention.

Turning to FIG. 6A, a functional block diagram incorporating a pre-coder unit 430 according to various embodiments of the invention is provided. In some embodiments, a set of source data 410 passes to the pre-coder unit 430. The pre-coder unit 430 may pre-code the set of source data 410 using any number and/or type of pre-coding scheme 624.

Preferably, each pre-coding scheme 624 is different from each other pre-coding scheme 624 in some way, generating hierarchal (or layered or partitioned) output. Purely by way of example, some or all of the different pre-coding schemes 624 may use different codecs, parameters, transformations, transcoding, algorithms, and other techniques to affect resolution, quantization, bit rate, temporality, quality, spatiality, complexity, or any other useful characteristic of the data.

In some embodiments, the pre-coder unit 430 is communicatively coupled with a processor unit 610. In some embodiments, the processor unit 610 may be part of the controller unit 440 of FIG. 4. In other embodiments, the processor unit 610 may be incorporated into the pre-coder unit 430. In still other embodiments, the processor unit 610 may be implemented as a separate component or in any other useful way. In certain embodiments, the processor unit 610 may control all or part of the functionality of the pre-coder unit 430. For example, where the pre-coder unit 430 pre-codes the set of source data 410 based on certain parameters, the processor unit 610 may perform functions, including generating or selecting the parameters, instructing the pre-coder unit 430 to use the parameters, etc.

In one embodiment, three pre-coding schemes (624-1, 624-2, and 624-3) are used to generate three sets of representation data (622-1, 622-2, and 622-3), respectively. The three sets of representation data (622-1, 622-2, and 622-3) may correspond to three hierarchical layers of representation of the set of source data 410. Each of these sets of representation data 622 may be stored in a representation data store 620.

Figure 6B:
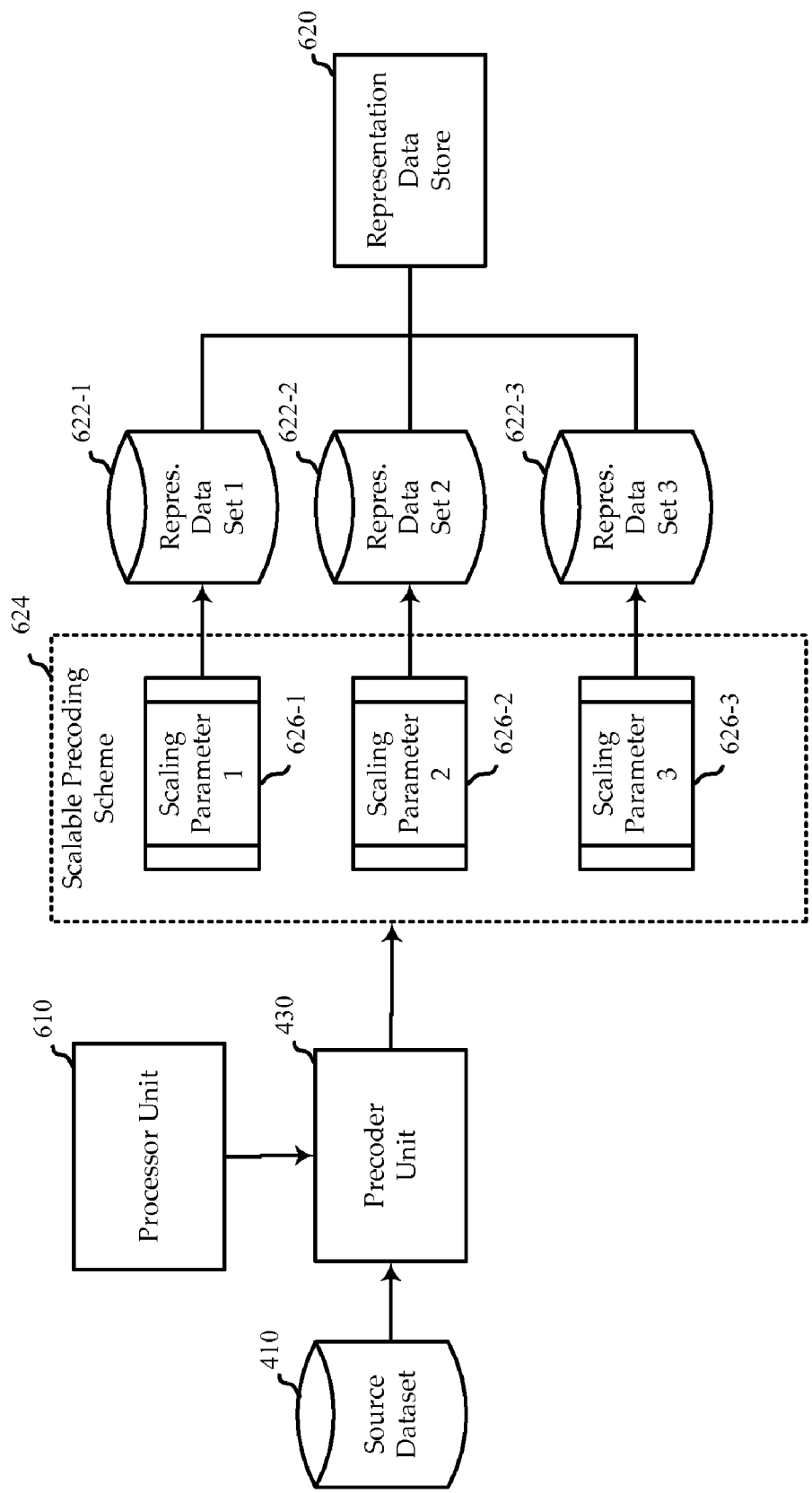
FIG. 6B provides another functional block diagram incorporating a pre-coder unit according to various embodiments of the invention.
Figure 6C:
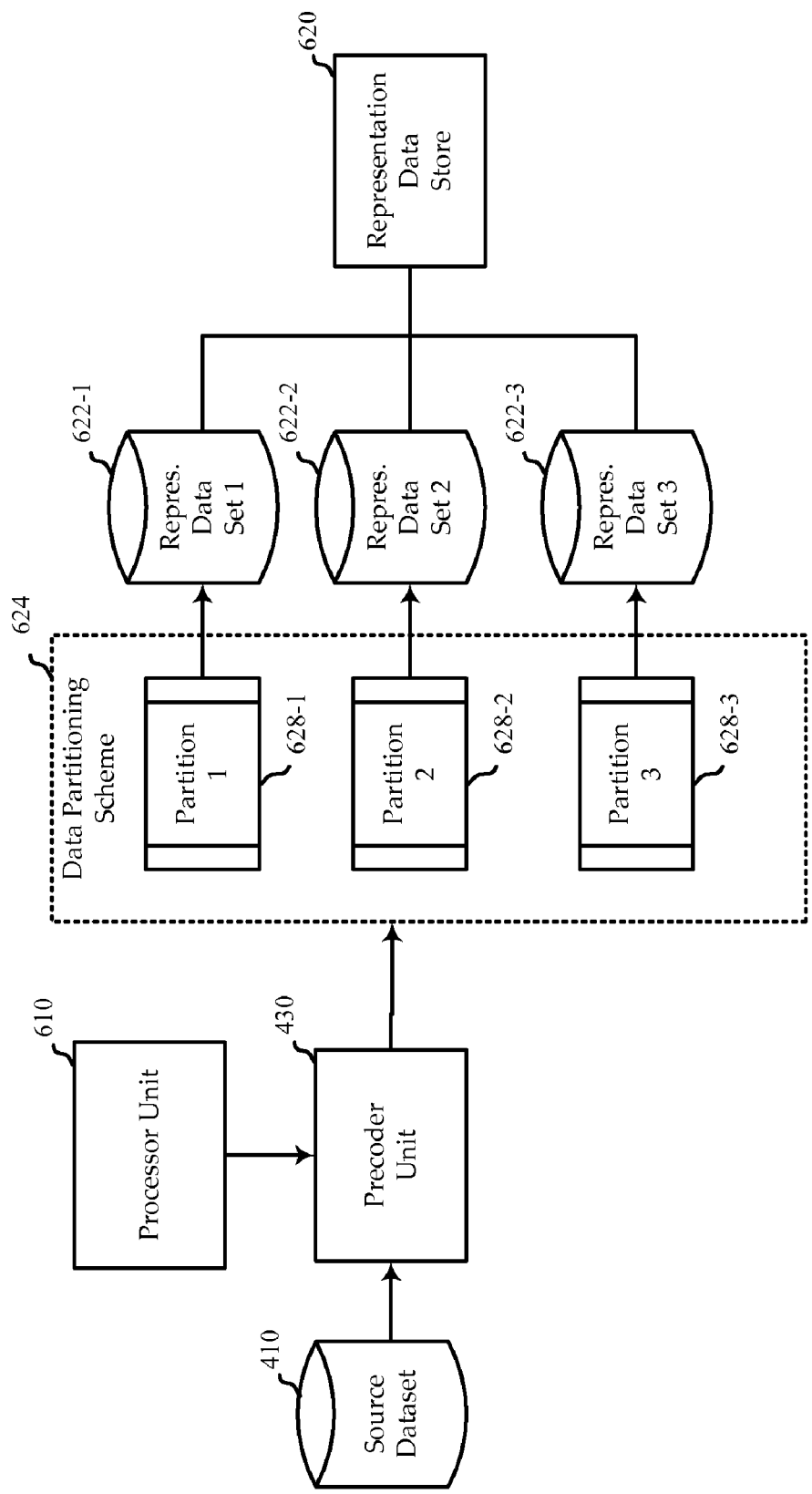
FIG. 6C provides yet another functional block diagram incorporating a pre-coder unit according to various embodiments of the invention.
Figure 6D:
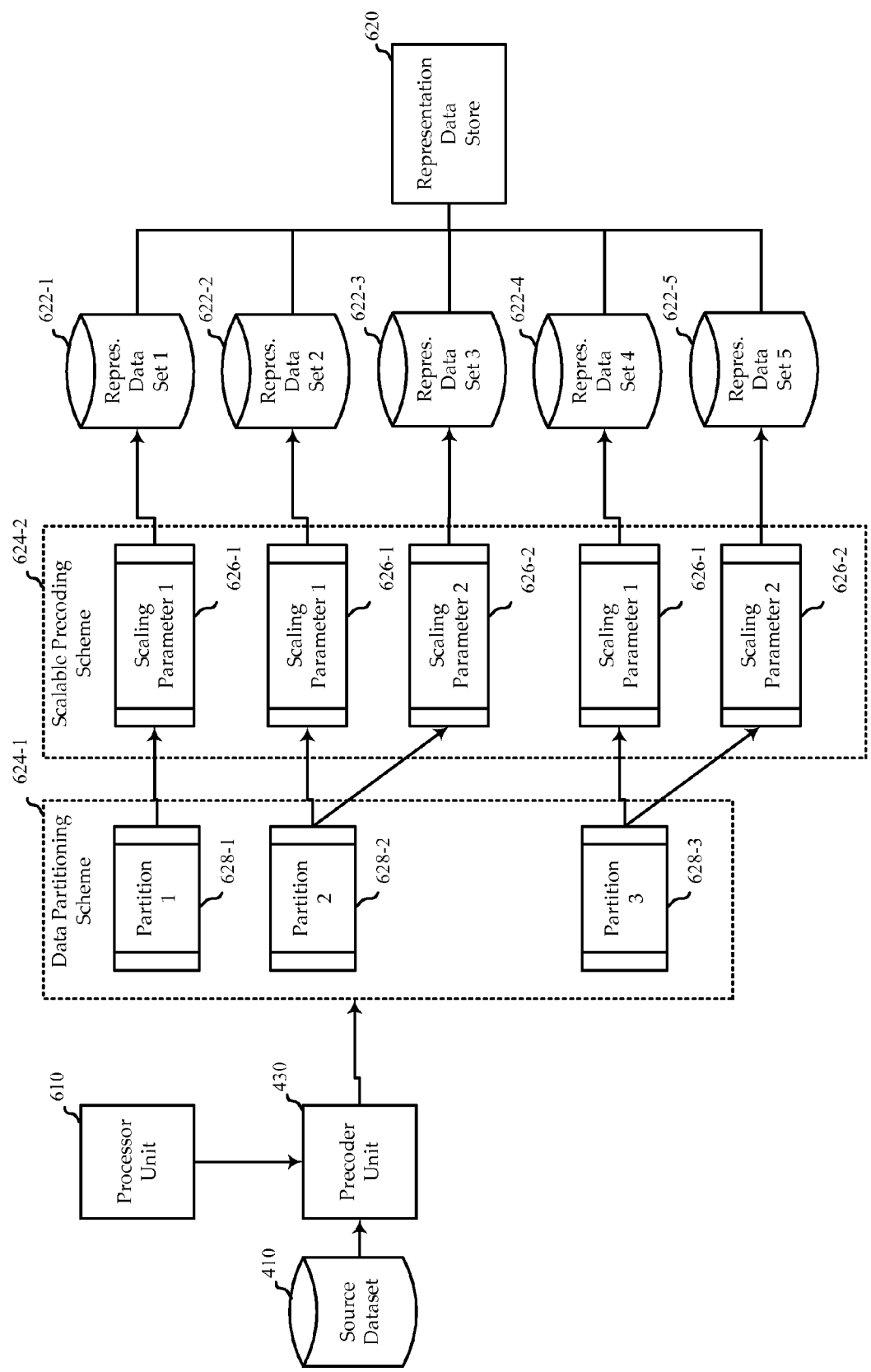
FIG. 6D provides still another functional block diagram incorporating a pre-coder unit according to various embodiments of the invention.

Further embodiments of the functionality in FIG. 6A are illustrated in the exemplary functional block diagrams of FIGS. 6B-6D. FIG. 6B provides a functional block diagram of a set of embodiments incorporating a pre-coder unit 430 using scalable pre-coding schemes 624 according to various embodiments of the invention.

In this set of embodiments, a set of source data 410 passes to the pre-coder unit 430. The pre-coder unit 430 pre-codes the set of source data 410 using a scalable pre-coding scheme 624. Scalable pre-coding schemes 624 may divide the set of source data 410 into different hierarchical layers. In some embodiments, a first (lowest-level) layer is called the base layer and higher layers are called enhancement layers. A scalable pre-coding scheme 624 may intend to achieve graceful degradation of the picture quality. For example, by providing the capability to playback data at a number of different levels, the pre-coding scheme 624 may avoid suffering from the "all or nothing" effect observed in some non-scalable coding systems.

In some embodiments, the scalable pre-coding scheme 624 may exploit different compression techniques to produce bit streams that are decodable at different bit rates. In one embodiment, a base layer contains the most critical information for playback that is determined to be "good enough" for a consumer. In this embodiment, enhancement layers may contain less critical information, like higher color depths, texturing, or resolution. Using this pre-coding scheme 624, it may be possible to provide a consumer with more reliable access to the base layer, such that a "good enough" level of playback is almost always available.

It will be appreciated that various types of scalability may be used. Purely by way of example, scalabilities may include quality, temporal, spatial and complexity scalability, in order to accommodate heterogeneous networks, different devices, various link conditions, or other communication environments. Among these scalabilities, various spatial and temporal scalable pre-coding schemes 624 may be known in the art, such as MPEG-2, MPEG-4 and H.263++. In addition, certain fine-granularity scalable ("FGS") pre-coding schemes 624 may be known in the art. For example, MPEG-4 standard (Part-2) may incorporate a FGS technique with the pre-coder unit 430 using the motion-compensated discrete cosine transform ("DCT") to generate a base layer as the lowest-level layer. Residual information between the original image and the reconstructed base layer image may be used to form one or more enhancement layers. An enhancement layer may be generated with a bit plane coding technique, which may provide fine granularity quality and temporal scalabilities.

Further, in certain embodiments, scalable pre-coding schemes 624 may provide error correction capabilities. For example, the MPEG-4 standard (Part-2) may be used to predict base layers and enhancement layers of future frames by using data from present frames. Using predicted data in the context of received data may allow correction of any bit stream truncation or lost packets, and may allow future frames to be more reliably recreated.

Regardless of the type or types of scalable pre-coding schemes 624 used, it may be preferable for each pre-coding scheme 624 to provide different scaling results for generating hierarchal output. Further, in some embodiments, the pre-coder unit 430 may be communicatively coupled with a processor unit 610, such that the processor unit 610 may control all or part of the functionality of the pre-coder unit 430. For example, the processor unit 610 may be configured to generate or select scaling parameters.

In one embodiment, one pre-coding scheme 624 is used with three scaling parameters (626-1, 626-2, and 626-3) to generate three sets of representation data (622-1, 622-2, and 622-3), respectively. The three sets of representation data (622-1, 622-2, and 622-3) may correspond to three hierarchical layers of representation of the set of source data 410. For example, the first set of representation data 622-1 may include base layer information, while the other two sets of representation data (622-2 and 622-3) may include enhancement layer information. Each of these sets of representation data 622 may be stored in a representation data store 620.

FIG. 6C provides a functional block diagram illustrating a set of embodiments of a pre-coder unit 430 using data partitioning pre-coding schemes 624 according to various embodiments of the invention. In this set of embodiments, a set of source data 410 passes to the pre-coder unit 430. The pre-coder unit 430 pre-codes the set of source data 410 using data partitioning pre-coding schemes 624. Data partitioning pre-coding schemes 624 may divide the set of source data 410 into different partitions.

Various data partitioning pre-coding schemes 624 may be known in the art. For example, data partitioning capabilities may be included in the H.264/AVC (adaptive video coding) standard. According to this standard, the pre-coder unit 430 may divide the set of source data 410 into three separate data partitions 628.

In one embodiment, three data partitions 628 may be defined to provide different levels of information representing the set of source data 410. A first partition 628-1 may contain syntax elements from header information within the set of source data 410, including macroblock types, quantization parameters, and motion vectors. A second partition 628-2 may contain intra-coded block patterns and transform coefficients. The second partition 628-2 may, for example, use various spatial prediction modes to exploit spatial statistical dependencies in the set of source data 410 for a single video frame. A third partition 628-3 may contain inter-coded block patterns and transform coefficients. The third partition 628-3 may, for example, use motion vectors for block based inter prediction to exploit block-shaped regions of each video frame in the set of source data 410.

The information contained in the first partition 628-1 (e.g., the header information of the set of source data 410) may represent a small portion of the set of source data 410, but it may be very critical to the recreation of the set of source data 410. For example, a "good enough" (or even a relatively high-quality) representation of the set of source data 410 may be recreated from only the information contained in the first partition 628-1, like macroblock types and motion vectors. On the contrary, information contained in the second partition 628-2 and the third partition 628-3 may be less critical while representing larger portions of the set of source data 410. Further information contained in the second partition 628-2 and the third partition 628-3 may be useful only in conjunction with information from the first partition 628-1.

It will be appreciated that other numbers and types of partitions are possible. Further, other steps may be required or desired as part of data partitioning pre-coding schemes 624. Regardless of the type or types of data partitions 628 used, it may be preferable for each pre-coding scheme 624 to use those data partitions 628 to provide hierarchal output. Further, in some embodiments, the pre-coder unit 430 may be communicatively coupled with a processor unit 610, such that the processor unit 610 may control all or part of the functionality of the pre-coder unit 430. For example, the processor unit 610 may be configured to generate or select data partitions 628.

In one embodiment, one data partitioning pre-coding schemes 624 is used with three data partitions 628 (628-1, 628-2, and 628-3) to generate three sets of representation data (622-1, 622-2, and 622-3), respectively. The three sets of representation data (622-1, 622-2, and 622-3) may correspond to three hierarchical partitions of the set of source data 410. For example, the first set of representation data 622-1 may include critical header information, while the other two sets of representation data (622-2 and 622-3) may include less critical intra- and inter-coded block patterns and transform coefficients. For example, using the H.264/AVC standard, the data partitions 628 may be encapsulated into separate network abstraction layer (NAL) packets, which may be collated into the sets of representation data 622. Each of these sets of representation data 622 may be stored in a representation data store 620.

FIG. 6D provides functional block diagram of a set of embodiments incorporating a pre-coder unit 430 using hybrid scalable and data partitioning pre-coding schemes 624 according to various embodiments of the invention. In this set of embodiments, the pre-coder unit 430 pre-codes the set of source data 410 using a combination of scalable and data partitioning pre-coding schemes 624.

In various embodiments, the scalable pre-coding schemes 624-2 and the data partitioning pre-coding schemes 624-1 may be used in different orders to provide the same or different results. In one embodiment, the scalable pre-coding schemes 624-2 may create base and enhancement layers of the set of source data 410, and the data partitioning pre-coding schemes 624-1 may divide some or all of those layers into different partitions. In another embodiment, the data partitioning pre-coding schemes 624-1 may divide the set of source data 410 into a number of partitions, which may then be layered using the scalable pre-coding schemes 624-2.

It will be appreciated that various scalable and data partitioning pre-coding schemes 624 may be known in the art. Further, it will be appreciated that different types of pre-coding schemes 624 may manifest various drawbacks. For example, many data partitioning pre-coding schemes 624-1 (e.g., H.264/AVC) may lack flexibility in the creation of data partitions 628. Additionally, many scalable pre-coding schemes 624-2 (e.g., FGS) may degrade compression efficiencies. Some combinations of pre-coding schemes 624 may be able to minimize some of these drawbacks.

In the embodiment shown in FIG. 6D, a set of source data 410 passes to the pre-coder unit 430. The pre-coder unit 430 may use data partitioning pre-coding schemes 624-1 to divide the set of source data 410 into three data partitions (628-1, 628-2, and 628-3). The pre-coder unit 430 may then apply scalable pre-coding schemes 624-1 to each of the three data partitions (628-1, 628-2, and 628-3).

In one embodiment, H.264/AVC data partitioning pre-coding schemes 624-1 are used to generate the three data partitions (628-1, 628-2, and 628-3). For example, as described above with respect to FIG. 6C, the first partition 628-1 may contain critical header and other information, while the second partition 628-2 and the third partition 628-3 may contain less critical DCT information. Each of the three data partitions (628-1, 628-2, and 628-3) may then be passed to MPEG-4 scalable pre-coding schemes 624-2, configured with a first scaling parameter 626-1 and a second scaling parameter 626-2.

In this embodiment, the first partition 628-1 may be further pre-coded, using the first scaling parameter 626-1, thereby generating a first set of representation data 622-1. The second partition 628-2 may be further pre-coded into two layers, using both scaling parameters (626-1 and 626-2), thereby generating second and third sets of representation data (622-2 and 622-3). The third partition 628-3 may also be further pre-coded into two layers, using both scaling parameters (626-1 and 626-2), thereby generating fourth and fifth sets of representation data (622-4 and 622-5). It will be appreciated that further pre-coding the second and third data partitions (628-2 and 628-3) may create layers based on any useful characteristic of the partitioned data. For example, the base layers of the data partitions (e.g., what generated the second and fourth sets of representation data (622-2 and 622-4)), may contain coarsely quantized DCT coefficients, while the enhancement layers of the data partitions (e.g., what generated the third and fifth sets of representation data (622-3 and 622-5)), may contain refinement information from which a finer quantization can be obtained.

In some embodiments, the pre-coder unit 430 may be communicatively coupled with a processor unit 610, such that the processor unit 610 may control all or part of the functionality of the pre-coder unit 430. In certain embodiments, the processor unit 610 may be configured to generate or select data partitions 628. In other embodiments, the processor unit 610 may be configured to generate or select scaling parameters 626. In still other embodiments, the processor unit 610 may be configured to generate or select both data partitions 628 and scaling parameters 626. It will be appreciated that the processor unit 610 may be utilized in many ways to add capabilities and flexibility to the functionality of the pre-coder unit 430. For example, the data partitioning and layering may be adjusted flexibly according to system throughput requirements and link conditions. To achieve greater flexibility, the pre-coding schemes 624 may be configured to dynamically change numbers and types of data partitions 628, numbers and types of scaling parameters 626, etc.

In addition to the many functions and capabilities of the pre-coder unit 430, various embodiments may provide many different coding and modulation capabilities. FIG. 7 provides an illustration of an exemplary table of identifier data 722 for use with various embodiments of the invention. The entries in the table of identifier data 722 show some possible coding and modulation schemes 705 and their associated identifiers 710. It will be appreciated that many types of coding and modulation are possible according to the invention. As such, the coding and modulation schemes 705 listed in the table of identifier data 722 are for illustrative purposes only and should not be construed as limiting the scope of the invention.

Each identifier 710 is associated with a coding and modulation scheme 705. For example, identifier "1" 710-1 is associated with a first coding and modulation scheme 705-1, representing quadrature phase shift keying with a one-to-four forward error correction ("FEC") rate (QPSK 1/4). In some embodiments, each identifier 710 may be a pointer to a set of information (e.g., an algorithm or a set of parameters) needed to implement its associated coding and modulation scheme 705.

According to the table of identifier data 722, a shift from identifier "1" 710-1 to identifier "4" 710-2 maintains the same modulation order (QPSK) while increasing the information density of the FEC (from 1/4 to 1/2). The coding and modulation scheme 705-2 associated with identifier "4" 710-2 generates half as many error correction bits for each information bit as does the coding and modulation scheme 705-1 associated with identifier "1" 710-1.

It will be appreciated that different implementations may use different types of coding and modulation schemes 705. It will further be appreciated that different tables of identifier data 722 may be configured to have different margins between the coding and modulation schemes 705 or to associate the identifiers 710 differently. For example, a table of identifier data 722 may include only every third entry shown on the table of identifier data 722 in FIG. 7. It will further be appreciated that the table of identifier data 722 may include other types of data for various reasons, like signal quality indicators (e.g., measured signal to noise ratio, estimated signal to noise ratio, bit error rate, received power level, etc.).

When link conditions are poor (e.g., low signal-to-noise ratio), lower order modulation schemes and low information densities may be required for reliable delivery of data. This may result in fewer data bits being sent per unit time as well as inefficient uses of power and bandwidth. When link conditions are good, higher order modulation schemes may be used with higher information density. This may allow more data bits to be sent per unit time with more efficient usage of power and bandwidth.

In many communication systems, the situation may be complicated by the fact that data is being sent to multiple subscribers with different characteristics (e.g., in different geographic locations, having different receiving capabilities, having different entitlement levels, etc.). When data packets are addressed to a single terminal (unicast), the packets may be sent using the most efficient coding and modulation scheme 705 that the communication link will support. However, when data packets are addressed to many receivers (multicast or broadcast), the packets may have to be sent using the coding and modulation scheme 705 that the receiver with the worst link in the group can support.

A similar effect may be seen in various communication links within a routing path. For example, a network node may be in communication with multiple other network nodes by way of multiple communication links. Many typical networks may ignore the characteristics of individual communication links when determining how best to encode data. Further, many typical networks may ignore the changing conditions of those communication links, failing to adaptively handle those changes through adaptive encoding techniques.

By using certain ACM-aware techniques, pre-coding schemes and/or coding and modulation schemes 705 may be dynamically selected to match changing link conditions. In one embodiment, coding and modulation schemes 705 are selected by using the identifiers 710 and the table of identifier data 722. The coding and modulation schemes 705 are then encapsulated, coded, mapped, and transmitted in any of a variety of ways, as known in the art. ACM is then implemented using the DVB-S2 standard, which specifically provides for its use. It will be appreciated that other implementations are possible, for example, including systems using DOCSIS or WiMax.

In some embodiments, the table of identifier data 722 and any other related information may be stored in an identifier store 720. The identifier store 720 may store the table of identifier data 722 in any useful way. For example, the table of identifier data 722 may be hard-wired into a microchip, or stored as a flat file or a relational database.

Figure 8:
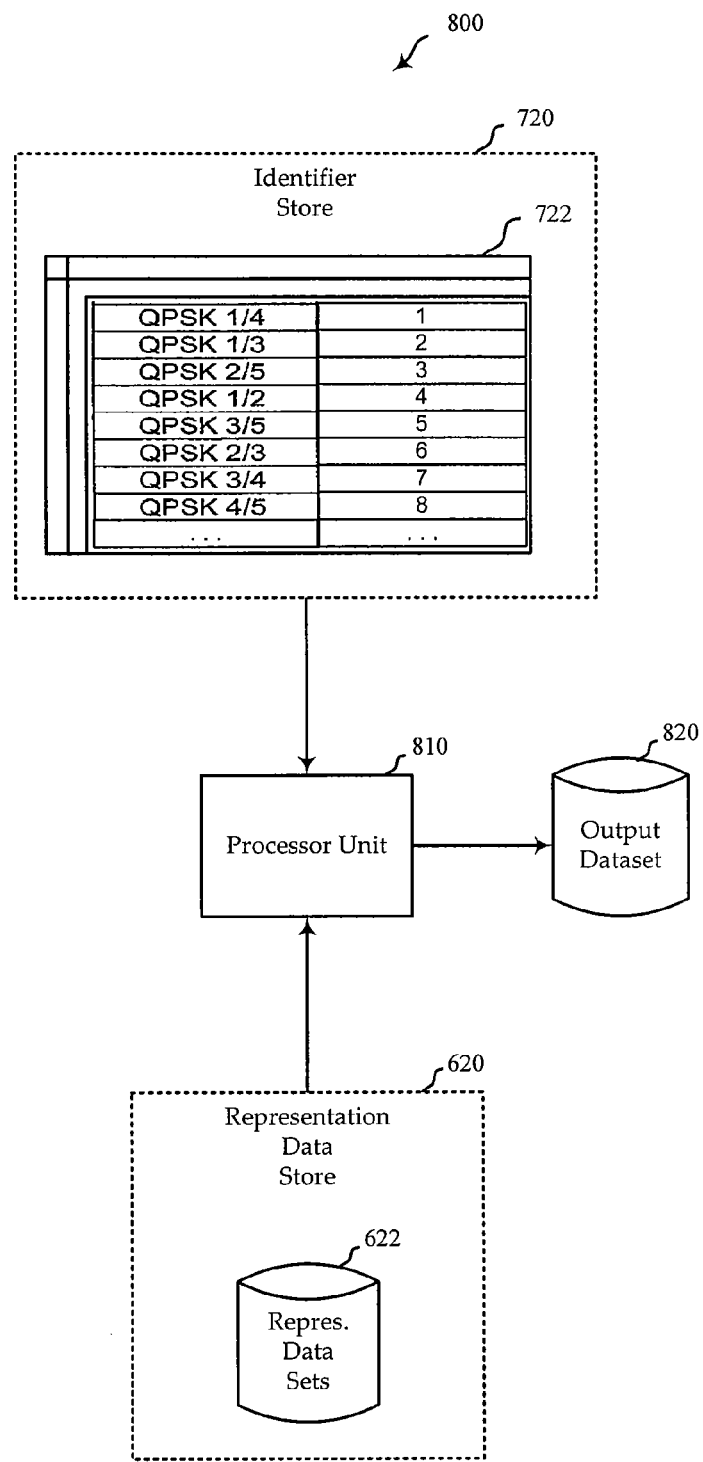
FIG. 8 provides a simplified block diagram of a controller unit according to various embodiments of the invention.

FIG. 8 provides a functional block diagram of a device 800 incorporating a processor unit 810, a representation data store 620, and an identifier data store 720 according to various embodiments of the invention. In some embodiments, the device may be or may include the controller unit 440 of FIG. 4.

In some embodiments, the processor unit 810 is communicatively coupled with the representation data store 620 and the identifier data store 720. The representation data store 620 may be configured to store sets of representation data 622 and the identifier data store 720 may be configured to store a table of identifier data 722. In certain embodiments, the processor unit 810 may be configured to process data from both the representation data store 620 and the identifier data store 720 to generate a set of output data 820. In other embodiments, the processor unit 810 may be configured to control at least a portion of the generation or processing of the data stored in either or both of the representation data store 620 and the identifier data store 720.

Figure 9A:
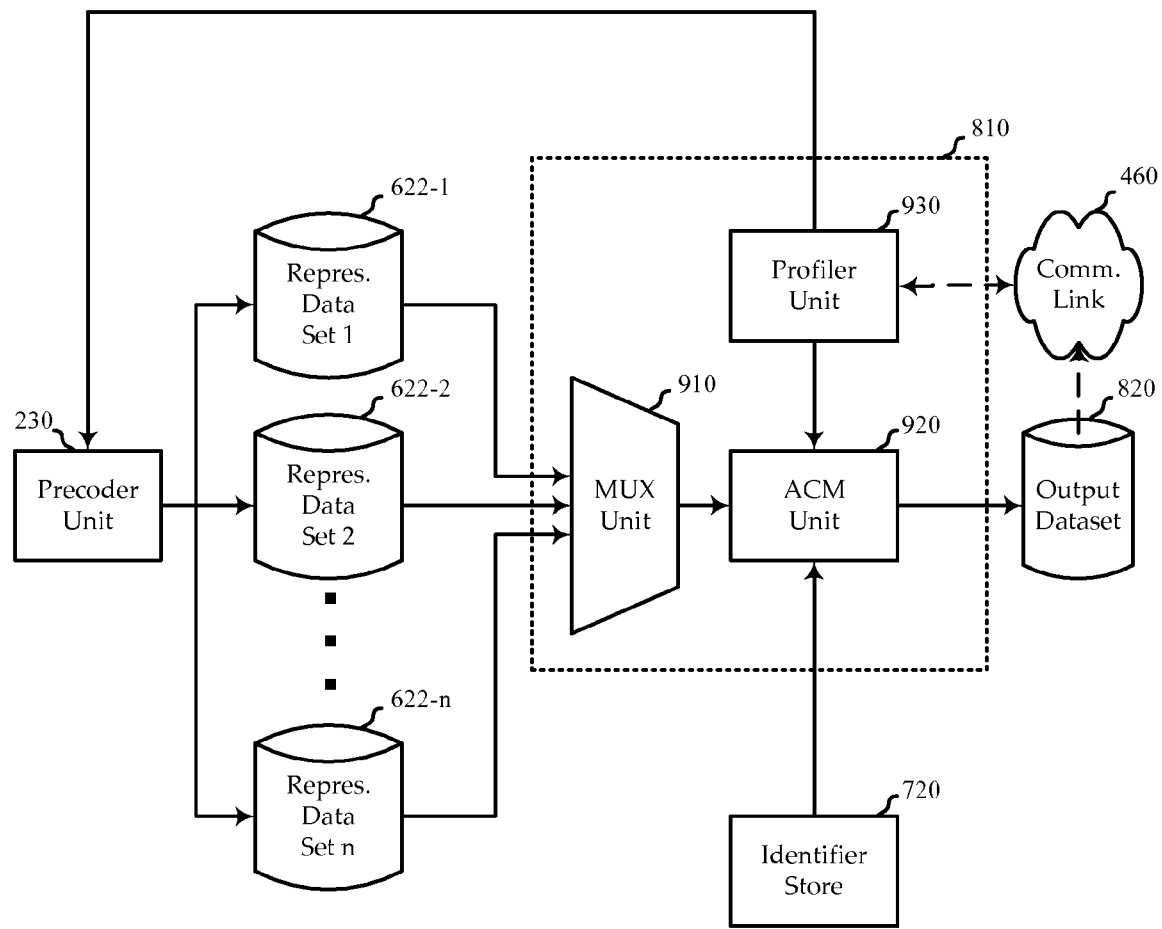
FIG. 9A provides a functional block diagram incorporating a processor unit according to various embodiments of the invention.
Figure 9B:
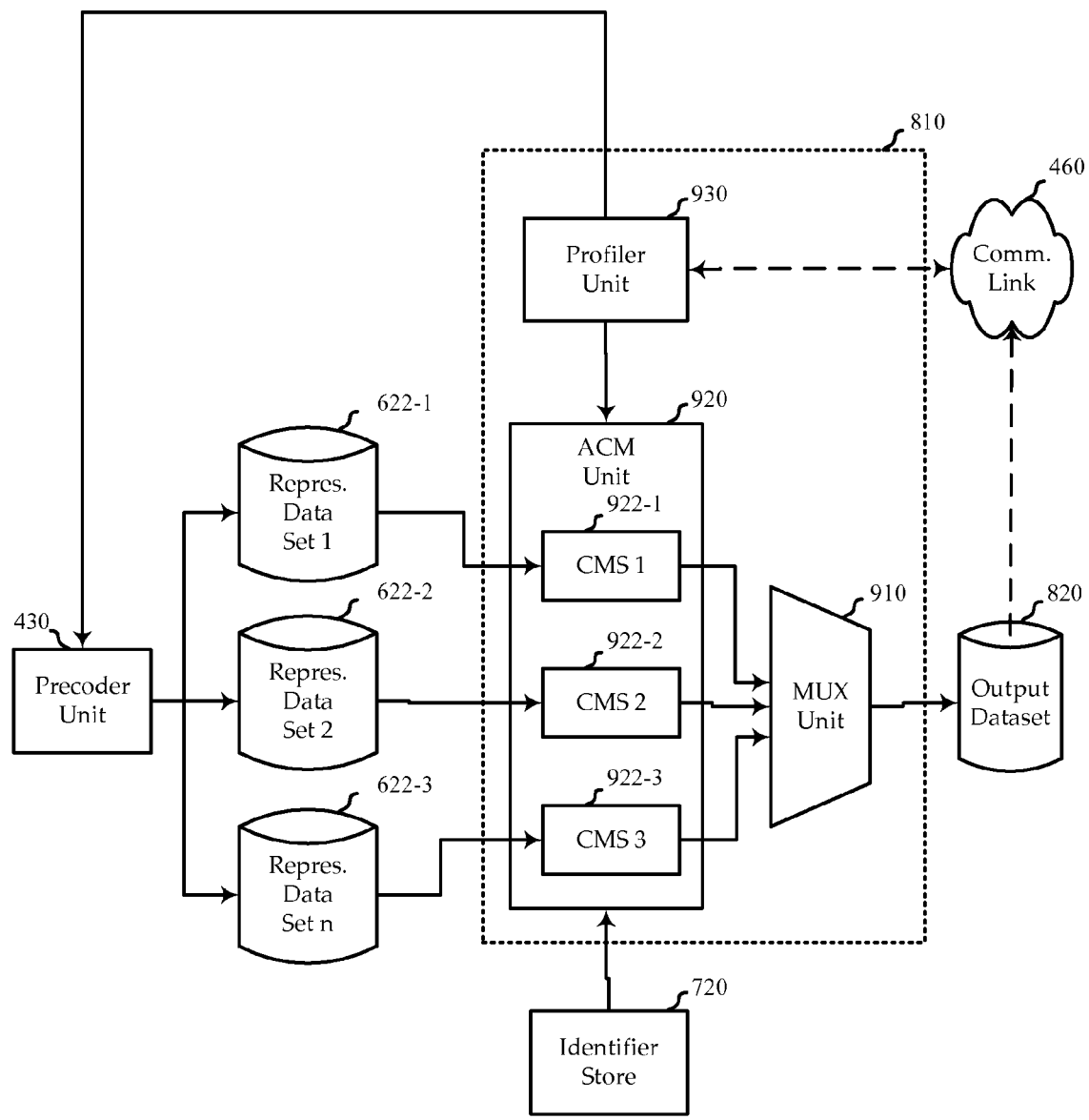
FIG. 9B provides another functional block diagram incorporating a processor unit according to various embodiments of the invention.

The capabilities and functionality of the processor unit 810 are discussed further in FIGS. 9A and 9B. FIG. 9A provides a functional block diagram incorporating a processor unit 810 according to various embodiments of the invention. In some embodiments, the processor unit 810 is the same as or is part of the controller unit 440 of FIG. 4. The processor unit 810 may receive sets of representation data 622 from the pre-coder unit 430 and identifier data from the identifier data store 720.

In some embodiments, the processor unit 810 may receive sets of representation data 622 from the pre-coder unit 430. The sets of representation data 622 may pass through a multiplexer unit 910. The multiplexer unit 910 may multiplex the data in any useful way, for example, by time division multiplexing ("TDM"), frequency division multiplexing ("FDM"), wavelength division multiplexing ("WDM"), code division multiplexing ("CDM"), polarization, or any other effective technique.

The multiplexer unit 910 may be communicatively coupled with an ACM unit 920. The ACM unit 920 may be further communicatively coupled with an identifier data store 720 and configured to receive identifier data stored at the identifier data store 720. Using the identifier data, the ACM unit 920 may implement ACM on the multiplexed data coming from the multiplexer unit 910 to generate a set of output data 820.

In one embodiment, the ACM unit 920 is implemented as a single module, which is configured to accept only a single stream of data. In this embodiment, the purpose of the multiplexer unit 910 may be to produce serial data for use by the single-stream ACM unit 920. Packets of information belonging to sets of representation data 622 coming from the pre-coder unit 430 may be tagged with information that represents to which of the sets of representation data 622 each packet belongs. For example, packets of data may be appended with header information that includes a designator number representing a particular set of representation data 622. Using the tags, the multiplexer unit 910 may multiplex the data from the multiple sets of representation data 622 to produce a single stream of data for the ACM unit 920.

In another embodiment, the set of source data (not shown) received by the pre-coder unit 430 includes data for multiple source programs (e.g., multiple video streams). At times (e.g., when link conditions are substantially static), the pre-coder unit 430 may be configured to pre-code each of the multiple source programs into the same sets of representation data 622, using the same pre-coding schemes. For example, a set of source data for a first program and a set of source data for a second program may each be pre-coded into a base layer and an enhancement layer. The multiplexer unit 910 may multiplex the two base layers (i.e., one from each program) into one data stream and multiplex the two enhancement layers into a second data stream. The two data streams each may then pass to the ACM unit 920.

In some embodiments, the ACM unit 920 generates a set of output data 820. The set of output data 820 may include one or more signals configured to be transmitted over a communication link 460. The signal or signals may be coded and/or modulated as dictated by the ACM unit 920. Further, the signal or signals may be coded and/or modulated in any additional way or combination of ways for transmission over the communication link 460. It will be appreciated that one or more signals may not be included in the set of output data. For example, at times when insufficient bandwidth is available for sending multiple signals, the output data may include only one signal or only one set of representation data 622.

It will be appreciated that the processor unit 810 may be configured in different ways according to the invention. For example, turning to FIG. 9B, another functional block diagram incorporating a processor unit according to various embodiments of the invention is provided. In the embodiments of FIG. 9B sets of representation data 622 coming from the pre-coder unit 430 pass through the ACM unit 920 before they are multiplexed by the multiplexer unit 910. Three sets of representation data (622-1, 622-2, and 622-3) may pass to the ACM unit 920. The ACM unit 920 may then use three coding and modulation schemes (922-1, 922-2, and 922-3), one on each of the three sets of representation data (622-1, 622-2, and 622-3). The three coding and modulation schemes (922-1, 922-2, and 922-3) may generate three output signals, which are multiplexed by the multiplexer unit 910 to generate a set of output data 820 containing a single multiplexed signal. This signal may then be transmitted over the communication link 460.

Other configurations may also be possible according to the invention. In some embodiments, the ACM unit 920 may include a channel coding unit and a modulation unit. In one embodiment, each of the channel coding unit and the modulation unit may be independently controllable or may be configured to work in conjunction with one another. In another embodiment, the multiplexer unit 910 may multiplex multiple streams of data coming from the channel coding unit with different coding schemes and pass them as a single stream of data to the modulation unit.

Returning to FIG. 9A, in one embodiment, sets of representation data 622 are generated by the processor unit 810 using scalable pre-coding schemes. The sets of representation data 622 may then include a base layer and one or more enhancement layers. The layers may be multiplexed in the multiplexer unit 910 before being passed to the ACM unit 920. The ACM unit 920 may then use DVB-S2 to apply a QPSK 1/2 coding and modulation scheme to the multiplexed data, thereby generating a QPSK 1/2 signal for transmission over the communication link 460.

In some embodiments, the ACM unit 920 is further communicatively coupled to a profiler unit 930. The profiler unit 930 may be communicatively coupled with the communication link 460 and the pre-coder unit 430. The profiler unit 930 may also be configured to determine certain communication link profiles relating to the communication link 460. It will be appreciated that the profiler unit 930 may generate communication link profiles by detecting or receiving data intrinsic to and/or extrinsic to the communication link 460, by receiving information from other systems or components, or in any other useful way.

In one embodiment, the profiler unit 930 periodically or continuously determines signal-to-noise ratios ("SNRs") relating to the communication link 460 for use as communication link profiles. For example, the profiler unit 930 may sample signals received at one end of the communication link 460 to determine the SNRs of the signals. Further, the SNRs may be recorded for statistical processing (e.g., to determine average SNRs or to determine SNR by signal type), for logging (e.g., to keep a record of SNRs at different times of day or in different link conditions), or for other reasons. It will be appreciated that the SNRs may be detected at either end of the communication link 460 (e.g., at either the network access unit end or the data terminal end) and by any effective method.

In another embodiment, the profiler unit 930 determines the bandwidth of the communication link 460 to generate a communication link profile. Similarly, the bandwidth of the communication link 460 may be provided to the profiler unit 930 manually or by another component, either before or when the communication link profile is generated. It will be appreciated that many other useful characteristics may be detected from the communication link 460 to generate communication link profiles, including, for example, throughput, hop count, path length, physical latency, bit error rate, power consumption, power availability, excess bandwidth, traffic congestion, etc.

In yet another embodiment, the profiler unit 930 determines an audience metric, which may be used as a communication link profile. There may be many ways to determine an audience metric. For example, the audience metric may be determined by detecting the number of subscribers receiving a signal, the number of subscribers playing back the signal (e.g., watching the video data), polling subscribers to determine the number of subscribers planning to playback the signal. In some embodiments, the signal may include multicast information (information transmitted to subscribers who have joined the multicast stream). In those embodiments, the audience metric may relate to the number or type of subscribers who have joined the multicast stream.

In still another embodiment, the profiler unit 930 may determine or receive a receiver capability, which may be used as a communication link profile. In some embodiments, a data terminal may include a receiver for receiving signals from the communication link 460. The receiver may have limited capabilities, due to limitations, for example, in a port or antenna, in a playback mechanism, in a decoding mechanism, etc. For example, a subscriber may be receiving video signals on a mobile phone. The phone may have a small screen with limited resolution, a small antenna with limited range, a small battery with limited power, etc.

In even another embodiment, the profiler unit 930 may determine or receive authorization to transmit signals over the communication link 460 in certain ways, which may be used as a communication link profile. In some embodiments, subscribers may have accounts with a service provider, which are associated with certain entitlement information. For example, a subscriber may be able to purchase a base package, which entitles the subscriber to receive and/or playback only base layer information generated by a scalable pre-coding scheme (e.g., a low-resolution video). Other subscribers may be able to purchase the additional entitlement to receive and/or playback enhanced layers (e.g., a high-definition video). In other embodiments, other parties may be at least partially responsible for the generation of the communication link profiles. For example, a backbone provider may allocate certain bandwidths to certain applications at certain times of the day.

It will be appreciated that embodiments of the profiler unit 930 may determine or receive profile information of one or more communication links or network elements. For example, the profiler unit 930 may receive profile information for all the communication links and network elements that make up a particular routing path. This information may then be used to facilitate routing-related determinations, like appropriate routing path, pre-coding schemes, coding and modulation schemes, etc. These determinations may then be used to handle network inefficiencies, like load imbalances.

In some embodiments, the profiler unit 930 is communicatively coupled with either or both of the ACM unit 920 and the pre-coder unit 430. Thus, in certain embodiments, the profiler unit 930 may use communication link profiles to determine certain parameters of pre-coding schemes used by the pre-coder unit 430 (e.g., scaling parameters, data partitions, etc.), or to assign identifiers to appropriate coding and modulation schemes. In other embodiments, the profiler unit 930 may generate, modify, or otherwise influence the functionality of both the ACM unit 920 and the pre-coder unit 430 in other ways to best suit data to various communication link profiles.

In an embodiment where the profiler unit 930 generates communication link profiles using an audience metric, different audience metrics may be used in different ways. For example, the bandwidth required for a popular program may be permitted to increase at the expense of less popular programs. To this effect, the popular program may be encoded at a high bit rate, and sent using a very low order (reliable) modulation and coding scheme. Alternately, the least popular programs may be encoded at a low bit rate, and sent using a high order modulation and coding scheme. In a satellite communication system according to this embodiment, one result may include an improved balance between the overall fixed bandwidth of the satellite transponder and service quality and availability.

In another embodiment, the profiler unit 930 generates communication link profiles at least in part based on weather patterns. As the weather worsens, link conditions may also worsen, decreasing the reliability of data transfers over the communication link 460. To compensate for worsening conditions, the profiler unit 930 may direct the ACM unit 920 to increase transmission reliability by using higher order coding and modulation schemes (e.g., higher order modulation schemes, lower information density, etc.). The change in coding and modulation schemes may be implemented, for example, by assigning identifiers to higher order coding and modulation schemes in a table like the identifier data table 722 of FIG. 7. The new assignments in the table may then be used by the ACM unit 920 to generate the set of output data 820 for transmission.

In yet another embodiment, the profiler unit 930 generates communication link profiles at least in part based on notifications generated by a data terminal 330. As discussed above with reference to FIG. 5, embodiments of data terminals may be configured to provide notices on certain conditions. For example, a data terminal may be configured to store received and decoded sets of representation data 622 for later playback by a subscriber. The data terminal may provide notifications, for example, when certain sets of representation data 622 failed to be reliably received (e.g., and must be resent), when subscribers request or subscribe to certain sets of representation data 622, etc. In these and other cases, the profiler unit 930 may receive a notification and generate communication link profiles to respond to those notifications. For example, if a set of representation data 622 failed to be received, the set of representation data 622 may be retransmitted using a more reliable coding and modulation scheme.

In still another embodiment, the profiler unit 930 may generate communication link profiles based on a variety of different types of data. For example, the profiler unit 930 may receive a notification from a data terminal requesting retransmission of a set of representation data 622. The profiler unit 930 may poll the communication link 460 to determine its bandwidth, waiting to detect that excess bandwidth is available. When excess bandwidth is available on the communication link 460, the profiler unit 930 may direct the ACM unit 920 to retransmit the requested set of representation data 622 using a very reliable (but bandwidth inefficient) coding and modulation scheme.

Figure 10A:
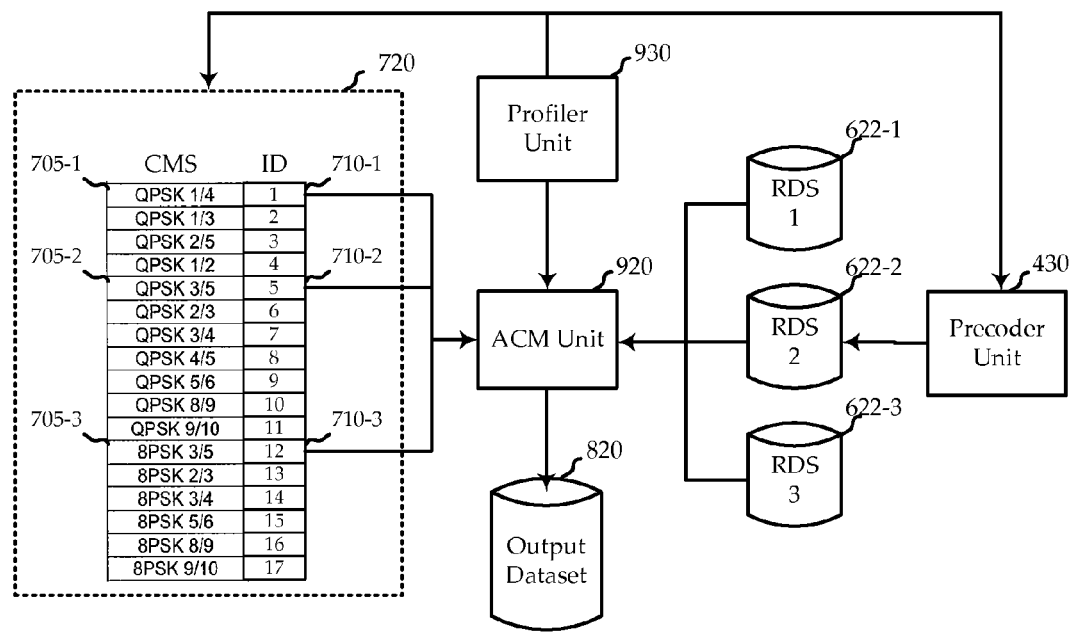
FIGS. 10A and 10B provide an exemplary embodiment illustrating adapting certain coding and modulation schemes to link conditions according to various embodiments of the invention.
Figure 10B:
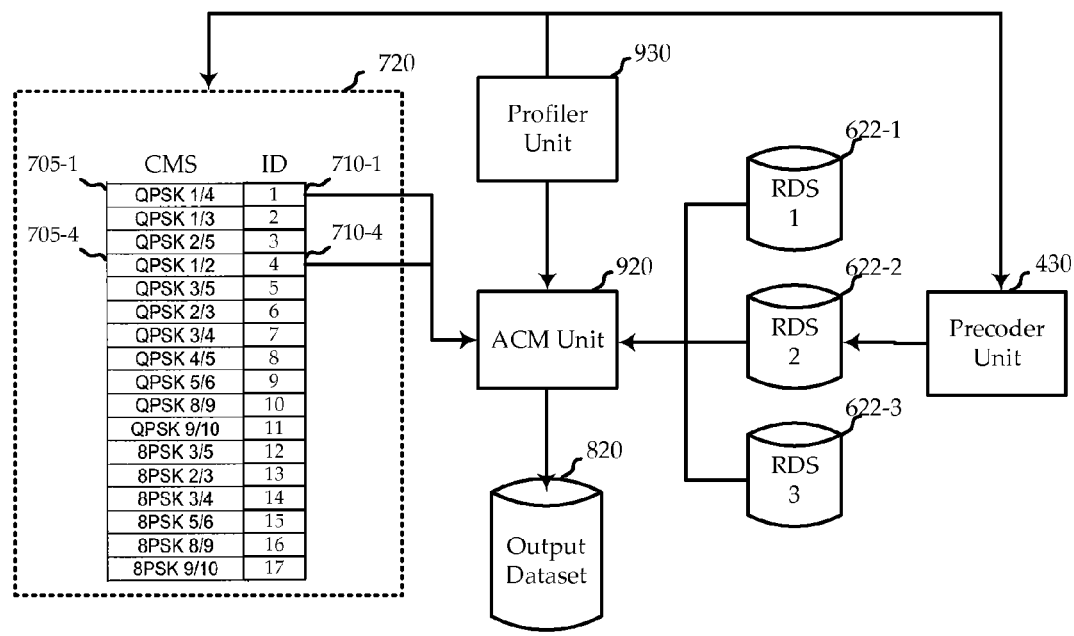

FIG. 10A and FIG. 10B provide an exemplary embodiment illustrating adapting coding and modulation schemes to link conditions according to various embodiments of the invention. In FIG. 10A, three sets of representation data (622-1, 622-2, and 622-3) pass from a pre-coder unit 430 to an ACM unit 920. Based on information provided by the profiler unit 930, identifiers 710 have been assigned to coding and modulation schemes 705 in an identifier data store 720.

As illustrated, the first set of representation data 622-1 is associated with identifier "1" 710-1, which is further identified with a QPSK 1/4 coding and modulation scheme 705-1. The second set of representation data 622-2 is associated with identifier "2" 710-2, which is further identified with a second coding and modulation scheme 705-2. The second coding and modulation scheme 705-2 represents the same order modulation scheme (i.e., QPSK) as the first coding and modulation scheme 705-1, but with higher information density (i.e., $3/5$ provides fewer error correction bits per information bit than $1/4$). The third set of representation data 622-3 is associated with identifier "3" 710-3, which is further identified with a third coding and modulation scheme 705-3. The third coding and modulation scheme 705-3 represents a higher order modulation scheme than the first coding and modulation scheme 705-1 (i.e., 8PSK instead of QPSK), but with the same information density (i.e., $3/5$). Thus, the first set of representation data 622-1 may be transmitted with the highest reliability, relative to the other sets of representation data (622-2 and 622-3).

FIG. 10B illustrates the same embodiment of the invention, illustratively adapted to worsening link conditions. Still, three sets of representation data (622-1, 622-2, and 622-3) pass from a pre-coder unit 430 to an ACM unit 920. Here, however, the profiler unit 930 has detected worsening link conditions (e.g., heavy rain). In response, identifiers 710 have been reassigned to more reliable coding and modulation schemes 705 in the identifier data store 720.

As illustrated, the first set of representation data 622-1 is still associated with identifier "1" 710-1, which is still further identified with a QPSK 1/4 coding and modulation scheme 705-1. No change is made to these assignments, as the QPSK 1/4 coding and modulation scheme is the most reliable option provided in the identifier data store 720. However, the second set of representation data 622-2 associated with identifier "2" 710-2 is now further associated with a new coding and modulation scheme 705-4 (QPSK 1/2). The new coding and modulation scheme 705-4 represents the same order modulation scheme (i.e., QPSK) as the second coding and modulation scheme 705-2 used in FIG. 10A, but with lower information density (i.e., $1/2$ instead of $3/5$). Further, the third set of representation data 622-3 is re-associated with identifier "2" 710-2, further associating the third set of representation data 622-3 with the same new coding and modulation scheme 705-4 as is associated with the second set of representation data 622-2. Now, the first set of representation data 622-1 may still be transmitted with the highest reliability, but the other sets of representation data (622-2 and 622-3) will also be more reliably transmitted.

Figure 11:
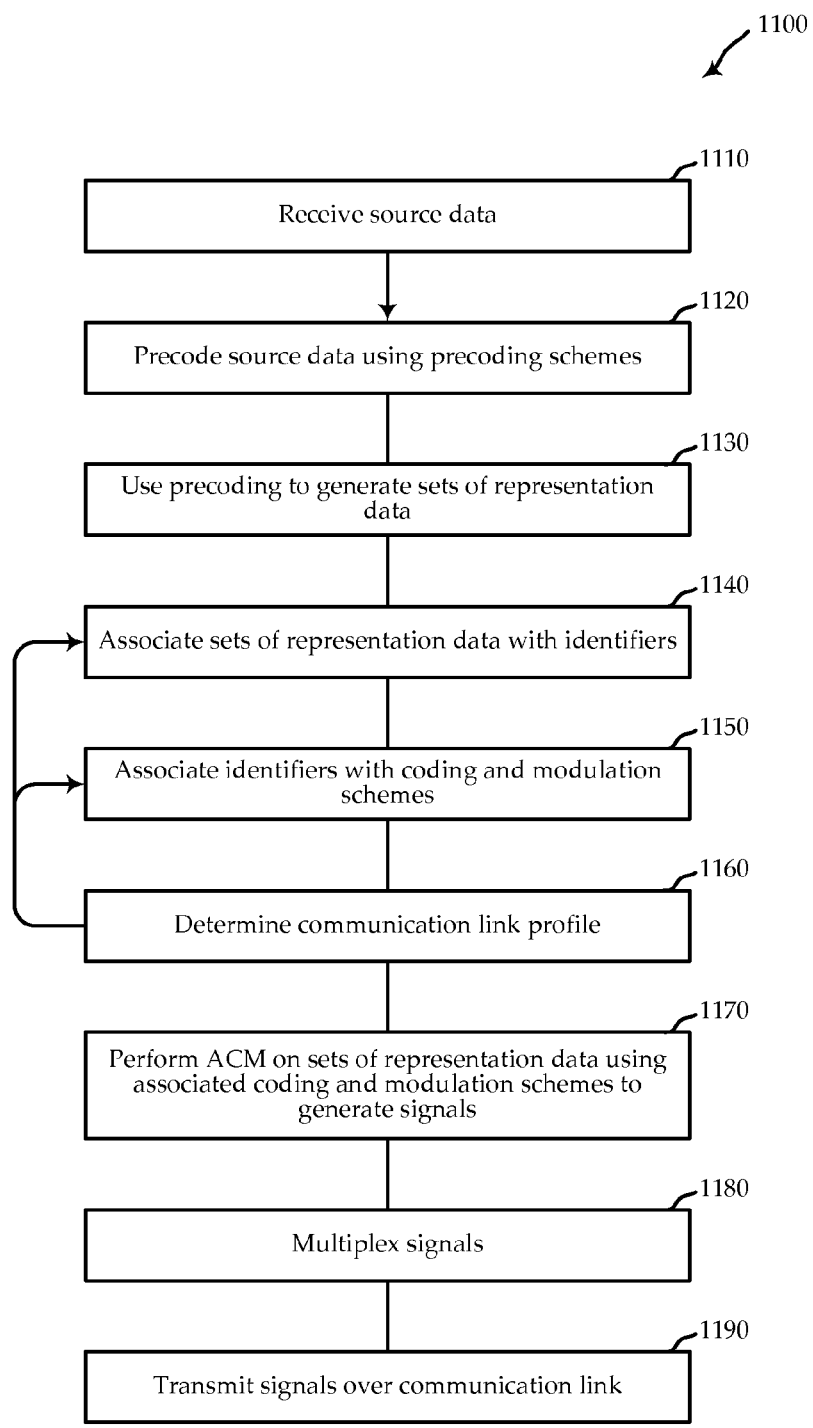
FIG. 11 provides a flow diagram describing methods of transmitting hierarchical data in a layered communication system according to various embodiments of the invention.

The features of the various embodiments of FIGS. 3-10 may be implemented in a number of ways according to the invention. Further, the components and functionalities in those figures may be used to perform a number of different methods according to the invention. FIG. 11 provides a flow diagram describing methods of transmitting hierarchical data in a layered communication system according to various embodiments of the invention.

The method 1100 may begin by receiving a set of source data at block 1110. The set of source data may be any type of data, for example audio-visual data. The set of source data may be pre-coded at block 1120, using various pre-coding schemes. The pre-coding at block 1120 may generate sets of representation data at block 1130.

At block 1140, the sets of representation data generated at block 1130 may be associated with identifiers. In some embodiments, each identifier is associated with a coding and modulation scheme at block 1150. As such, each set of representation data may be associated to a coding and modulation scheme.

In some embodiments, a communication link profile is determined at block 1160. The communication link profile may relate to link conditions, receiver capabilities, subscriber entitlement, audience metrics, or any other useful characteristic of the communication environment in which the method 1100 is being implemented. In certain embodiments, assignments in either or both of blocks 1140 and 1150 may be dynamically adjusted to adapt to information from the communication link profile determined at block 11160.

At block 1170, ACM is performed on the sets of representation data using their associated coding and modulation schemes to generate one or more signals. In some embodiments, the signals may be multiplexed at block 1180 to generate a single signal for transmission. The signal or signals may then be transmitted over a communication link at block 1190.

Figure 12:
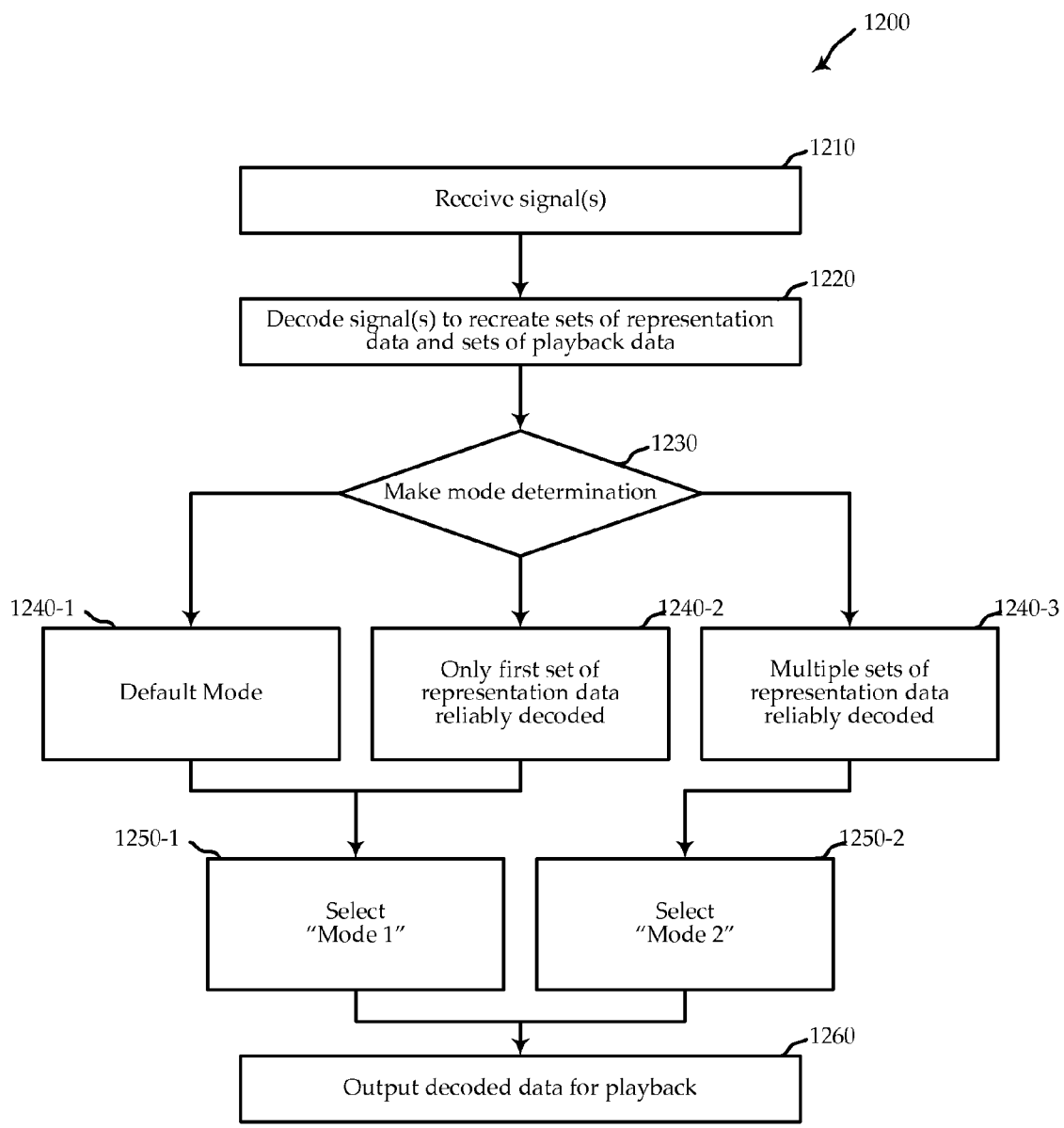
FIG. 12 provides a flow diagram describing methods of receiving hierarchical data in a layered communication system according to various embodiments of the invention.

FIG. 12 provides a flow diagram describing methods of receiving hierarchical data in a layered communication system according to various embodiments of the invention. The method 1200 may begin by receiving one or more signals at block 1210. The signals may contain coded and/or modulated sets of representation data from a set of source data. At block 1220, the signals may be decoded to recreate the sets of representation data, and to use the sets of representation data to playback a representation of the set of source data.

In some embodiments, multiple modes may be available for decoding the signals. At block 1230, a mode determination may be made. This mode determination may be based on any useful parameter, like signal quality of the received signals. In a first embodiment, a default mode is used at block 1240-1, resulting in a selection of "Mode 1" at block 1250-1. In a second embodiment, at block 1240-2, the received signal contains only a first set of representation data, or other sets of representation data cannot be reliably decoded (e.g., they are received with high bit error rates). In this second embodiment, "Mode 1" is also selected at block 1250-1. In a third embodiment, multiple sets of representation data are received at block 1240-3, allowing decoding for a high level playback of the set of source data. In this third embodiment, a second mode, "Mode 2," is selected at block 1250-2. At block 1260, the data decoded in the various modes at blocks 1240 may be output for playback.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for determining a preferred routing path for communicating source data from a data source to a data terminal over a network having a plurality of routing path options, the method comprising:

determining a first routing path option, the first routing path option comprising a first set of communication links, wherein the data source and the data terminal are communicatively coupled via the first routing path option over the first set of communication links;

determining a second routing path option, the second routing path option comprising a second set of communication links, wherein the data source and the data terminal are communicatively coupled via the second routing path option over the second set of communication links, and wherein the second set of communication links is at least partially different from the first set of communication links;

receiving a source dataset at a network node, wherein the source dataset comprises at least a portion of the source data, and the network node is in operative communication with at least one of the first set of communication links and at least one of the second set of communication links;

determining a hierarchical encoding scheme for pre-coding the transmission to generate at least one set of representation data;

generating a first routing path profile by evaluating the first routing path option as a function of a routing metric relating to the hierarchical encoding scheme;

generating a second routing path profile by evaluating the second routing path option as a function of the routing metric;

determining a preferred routing path for routing at least a portion of the source dataset by comparing the first routing path profile and the second routing path profile;

generating a transmission comprising applying the hierarchical encoding scheme to the source dataset to generate the at least one set of representation data; and routing the transmission over the preferred routing path.

2. The method of claim 1, further comprising:
determining a coding and modulation scheme for coding and modulating the at least one set of representation data, wherein:
generating the transmission further comprises applying the at least one coding and modulation scheme to the at least one set of representation data.

3. The method of claim 2, wherein:
each communication link is adapted to communicate the transmission between two of a plurality of nodes in the network; and
the transmission comprises a set of instructions adapted for use by at least one of the plurality of nodes in the network, the one of the plurality of nodes in the network communicating the transmission at least partially according to the set of instructions.

4. The method of claim 1, further comprising:
applying the hierarchical encoding scheme to the source dataset to generate a first set of representation data and a second set of representation data,
wherein generating the transmission comprises:
generating a first transmission by applying a first coding and modulation scheme to the first set of representation data; and
generating a second transmission by applying a second coding and modulation scheme to the second set of representation data.

5. The method of claim 4, wherein:
determining a preferred routing path comprises determining a first preferred routing path for communicating the first transmission and determining a second preferred routing path for communicating the second transmission; and
routing the transmission over the preferred routing path hod further comprises:
routing the first transmission over the first preferred routing path; and
routing the second transmission over the second preferred routing path.

6. The method of claim 1, wherein determining a preferred routing path comprises:
generating a routing optimization map comprising the first routing path profile and the second routing path profile.

7. The method of claim 6, wherein the routing optimization map further comprises a link characteristic associated with each of the first set of communication links and with each of the second set of communication links.

8. The method of claim 7, wherein the link characteristic comprises a hierarchical encoding scheme associated with each respective communication link.

9. The method of claim 7, wherein:
each communication link is adapted to communicate a transmission from an originating node to a destination node; and
the link characteristic comprises a set of instructions adapted for use by the origination node in communicating the transmission to the destination node.

10. The method of claim 7, wherein:
each communication link is adapted to communicate a transmission from an originating node to a destination node; and
the link characteristic comprises a node characteristic defining a characteristic of at least one of the origination node or the destination node.

11. The method of claim 7, wherein:
the routing metric relates to the link characteristic associated with the at least one of the first set of communication links and the at least one of the second set of communication links in operative communication with the network node.

12. The method of claim 1, wherein the hierarchical encoding scheme is determined for each of the first set of communication links.

13. The method of claim 1, further comprising:
determining a coding and modulation scheme as a function of a characteristic of the source dataset.

14. The method of claim 1, further comprising:
determining a coding and modulation scheme for coding and modulating the at least one set of representation data,
wherein the hierarchical encoding scheme is determined as a function of the coding and modulation scheme.

15. The method of claim 1, further comprising:
determining a coding and modulation scheme for coding and modulating the at least one set of representation data as a function of the hierarchical encoding scheme.

16. The method of claim 1, wherein the at least one set of representation data comprises a hierarchical representation of the set of source data.

17. A network element for use in a communications network providing a plurality of routing path options comprising at least a first routing path option and a second routing path option, the first routing path option having a first set of communication links and the second routing path option having a second set of communication links, the communications network being configured to adaptively communicate source data from a data source to a data terminal over at least one of the first routing path option or the second routing path option, the network element comprising:

a transceiver module, communicatively coupled with a source communication link, at least one of the first set of communication links and at least one of the second set of communication links, and adapted to receive a source dataset over the source communication link, the source dataset comprising a functional representation of at least a portion of the source data; and a controller module, operable to generate a transmission as a function of the source dataset and to determine a preferred routing path for routing the transmission by:
generating a first routing path profile by evaluating at least a portion of the first routing path option as a function of a routing metric;

generating a second routing path profile by evaluating at least a portion of the second routing path option as a function of the routing metric;

determining a hierarchical encoding scheme for encoding at least a portion of the source dataset to generate the transmission;

comparing the first routing path profile and the second routing path profile to determine a preferred routing path for the transmission; and applying the hierarchical encoding scheme to the at least a portion of the source dataset to generate the transmission, wherein the transceiver module is further adapted to communicate the transmission over the preferred routing path.

18. The network element of claim 17, wherein the transceiver module is communicatively coupled with a first source communication link adapted to receive a first set of source data and a second source communication link adapted to receive a second set of source data, the transceiver module comprising:

an aggregator module, adapted to aggregate the first set of source data and the second set of source data into the source dataset.

19. The network element of claim 17, wherein:

the preferred routing path defines a preferred next network element to which to communicate the transmission via at least one preferred communication link adapted to communicatively couple the transceiver module with the preferred next network element.

20. The network element of claim 19, wherein:

the transmission comprises a set of instructions adapted for use by the preferred next network element for further routing of the transmission.

21. The network element of claim 17, wherein determining a hierarchical encoding scheme comprises:

determining at least one pre-coding scheme for pre-coding the source dataset to generate at least one set of representation data, the at least one set of representation data comprising a hierarchical representation of the at least a portion of the incoming transmission.

22. The network element of claim 21, wherein determining a hierarchical encoding scheme comprises:

determining at least one coding and modulation scheme for coding and modulating the at least one set of representation data.

23. The network element of claim 17, wherein the hierarchical encoding scheme is determined at least partially as a function of a characteristic of the source dataset.

24. The network element of claim 17, wherein the hierarchical encoding scheme is determined at least partially as a function of the routing metric.

25. The network element of claim 17, wherein the routing metric is determined at least partially as a function of the hierarchical encoding scheme.

26. The network element of claim 17, further comprising: determining a preferred routing path profile associated with the preferred routing path.

27. The network element of claim 26, wherein the routing metric is determined at least partially as a function of the preferred routing path profile associated with the preferred routing path.

28. The network element of claim 26, further comprises: determining a preferred hierarchical encoding scheme for each communication link in the preferred routing path, wherein the preferred routing path profile comprises the preferred hierarchical encoding scheme associated with each communication link in the preferred routing path.

29. The network element of claim 26, wherein the preferred routing path profile comprises a communication link profile associated with each communication link in the preferred routing path.

30. The network element of claim 17, wherein:

applying the hierarchical encoding scheme to the at least a portion of the source dataset to generate the transmission comprises applying a first portion of the hierarchical encoding scheme to generate a first portion of the transmission and applying a second portion of the hierarchical encoding scheme to generate a second portion of the transmission;

comparing the first routing path profile and the second routing path profile to determine a preferred routing path for the transmission comprises determining a first preferred routing path for routing the first portion of the transmission and determining a second preferred routing path for routing the second portion of the transmission;

the first preferred routing path defines a first preferred next network element to which to communicate the transmission via a first preferred communication link adapted to communicatively couple the transceiver module with the first preferred next network element; and the second preferred routing path defines a second preferred next network element to which to communicate the transmission via a second preferred communication link adapted to communicatively couple the transceiver module with the second preferred next network element.

31. The network element of claim 30, wherein:

applying a first portion of the hierarchical encoding scheme to generate a first portion of the transmission comprises applying a first pre-coding scheme to the source dataset to generate a first set of representation data and applying a first coding and modulation scheme to the first set of representation data to generate the first portion of the transmission;

applying a second portion of the hierarchical encoding scheme to generate a second portion of the transmission comprises applying a second pre-coding scheme to the source dataset to generate a second set of representation data and applying a second coding and modulation scheme to the second set of representation data to generate the second portion of the transmission.

32. The network element of claim 17, wherein the pre-coding scheme comprises at least one of a scalable pre-coding scheme or a data partitioning scheme.

33. A method for determining a preferred routing path for communicating source data from a data source to a data terminal over a network having a plurality of routing path options, the method comprising:

determining a first routing path option, the first routing path option comprising a first set of communication links, wherein the data source and the data terminal are communicatively coupled via the first routing path option over the first set of communication links;

determining a second routing path option, the second routing path option comprising a second set of communication links, wherein the data source and the data terminal are communicatively coupled via the second routing path option over the second set of communication links, and wherein the second set of communication links is at least partially different from the first set of communication links;

receiving a source dataset at a network node, wherein the source dataset comprises at least a portion of the source data, and the network node is in operative communication with at least one of the first set of communication links and at least one of the second set of communication links;

determining a hierarchical encoding scheme for pre-coding the transmission to generate a first set of representation data and a second set of representation data;

generating a first routing path profile by evaluating the first routing path option as a function of a routing metric relating to the hierarchical encoding scheme;

generating a second routing path profile by evaluating the second routing path option as a function of the routing metric;

determining a preferred routing path for routing at least a portion of the source dataset by comparing the first routing path profile and the second routing path profile;

applying the hierarchical encoding scheme to the source dataset to generate the first set of representation data and the second set of representation data;

generating a first transmission by applying a first coding and modulation scheme to the first set of representation data; and generating a second transmission by applying a second coding and modulation scheme to the second set of representation data.

34. The method of claim 33, wherein:

determining the preferred routing path comprises determining a first preferred routing path for communicating the first transmission and determining a second preferred routing path for communicating the second transmission; and the method further comprises:

routing the first transmission over the first preferred routing path; and routing the second transmission over the second preferred routing path.

* * * * *